(12) United States Patent
Lee et al.

(10) Patent No.: US 10,046,772 B2
(45) Date of Patent: Aug. 14, 2018

(54) VEHICLE CONTROL DEVICE AND VEHICLE

(71) Applicants: Hyundai Motor Company, Seoul (KR); Korea Advanced Institute of Science and Technology, Daejeon (KR)

(72) Inventors: Seung Hwan Lee, Hwaseong (KR); Gee Hyuk Lee, Daejeon (KR); Sun Jun Kim, Daejeon (KR); Jae Hyun Han, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/523,901

(22) Filed: Oct. 26, 2014

(65) Prior Publication Data

US 2015/0217781 A1 Aug. 6, 2015

(30) Foreign Application Priority Data

Feb. 5, 2014 (KR) ........................ 10-2014-0013082

(51) Int. Cl.
*B60W 50/10* (2012.01)
*G01C 21/36* (2006.01)
(Continued)

(52) U.S. Cl.
CPC ............. *B60W 50/10* (2013.01); *G01C 21/36* (2013.01); *G06F 3/03547* (2013.01);
(Continued)

(58) Field of Classification Search
CPC .............................. B60W 50/10; G01C 21/36
(Continued)

(56) References Cited

U.S. PATENT DOCUMENTS 5,923,096 A * 7/1999 Manak ................ B60L 11/1805
180/65.1
7,159,471 B2 * 1/2007 Fortune .............. G01G 19/4142
177/210 C (Continued)

FOREIGN PATENT DOCUMENTS

JP 2005-227893 8/2005
JP 2010-026693 2/2010
(Continued)

OTHER PUBLICATIONS

Korean Office Action for Korea Application No. 10-2014-0013082, English translation, 15 pages.

*Primary Examiner* — Adam D Tissot
*Assistant Examiner* — Michael A Berns
(74) *Attorney, Agent, or Firm* — Mintz Levin Cohn Ferris Glovsky and Popeo, P.C.; Peter F. Corless

(57) ABSTRACT

A vehicle control device including a manipulating unit that is manipulated by a user and a vehicle having the same are provided. The vehicle control device includes a manipulating unit having an object detecting unit configured to detect an object in a noncontact manner and a pad disposed above the object detecting unit and having elasticity. In addition, a controller is configured to generate a control signal for operating a vehicle based on an output signal of the manipulating unit.

26 Claims, 35 Drawing Sheets

(51) Int. Cl.
*G06F 3/0488* (2013.01)
*G06F 3/041* (2006.01)
*G06F 3/042* (2006.01)
*G06F 3/0354* (2013.01)

(52) U.S. Cl.
CPC ............ *G06F 3/041* (2013.01); *G06F 3/0414* (2013.01); *G06F 3/0421* (2013.01); *G06F 3/0488* (2013.01); *G06F 3/04883* (2013.01); *G01C 21/3664* (2013.01); *G06F 2203/04105* (2013.01); *G06F 2203/04106* (2013.01); *G06F 2203/04108* (2013.01); *G06F 2203/04808* (2013.01)

(58) Field of Classification Search
USPC ............................................................ 701/1
See application file for complete search history.

(56) References Cited

U.S. PATENT DOCUMENTS

| | | | | |
|---|---|---|---|---|
| 8,169,414 B2* | 5/2012 | Lim | ................... | G06F 3/03547 |
| | | | | 178/18.01 |
| 8,477,111 B2* | 7/2013 | Lim | ................... | G06F 3/03547 |
| | | | | 178/18.01 |
| 8,542,209 B2* | 9/2013 | Lim | ................... | G06F 3/03547 |
| | | | | 178/18.01 |
| 8,638,312 B2* | 1/2014 | Lim | ................... | G06F 3/03547 |
| | | | | 178/18.01 |
| 8,659,554 B2* | 2/2014 | Quigley | .............. | B60R 11/0264 |
| | | | | 296/24.34 |
| 8,885,240 B2* | 11/2014 | Roth | ........................ | B60R 1/02 |
| | | | | 359/267 |
| 9,063,627 B2* | 6/2015 | Yairi | ........................ | G06F 3/044 |
| 9,319,044 B2* | 4/2016 | Park | ...................... | H03K 17/962 |
| 9,605,971 B2* | 3/2017 | Niehsen | .............. | G01C 21/3658 |
| 2014/0236454 A1* | 8/2014 | Mattes | .................. | G06F 3/0488 |
| | | | | 701/102 |
| 2014/0282269 A1* | 9/2014 | Strutt | ...................... | G06F 3/017 |
| | | | | 715/863 |
| 2015/0123937 A1* | 5/2015 | Schenkewitz | ........ | H03K 17/962 |
| | | | | 345/174 |

FOREIGN PATENT DOCUMENTS

| | | |
|---|---|---|
| KR | 10 0735376 | 6/2007 |
| KR | 10-2010-0136446 A | 12/2010 |
| KR | 10-2011-0028873 A | 3/2011 |
| KR | 10-2011-0062062 A | 6/2011 |
| KR | 2013-0015362 | 2/2013 |

* cited by examiner

VEHICLE CONTROL DEVICE AND VEHICLE

CROSS-REFERENCE TO RELATED APPLICATION

This application claims the benefit of Korean Patent Application No. P2014-13082, filed on Feb. 5, 2014 in the Korean Intellectual Property Office, the disclosure of which is incorporated herein by reference.

BACKGROUND

1. Field of the Invention

The present invention relates to a vehicle control device that is configured to receive a user command and a vehicle that includes the vehicle control device.

2. Description of the Related Art

Vehicles may perform additional functions for user convenience such as an audio function, a video function, a navigation function, air conditioning control, seat control, and lighting control in addition to a primary driving function. In order to perform such functions, the vehicle includes a display that is configured to display a menu screen or a control screen and receives selection of a desired menu or a control command for the selected menu from a user according to a hard key method, a touchscreen method, or a gesture recognition method.

However, when the hard key method is used, a substantial amount of space is required to accommodate a plurality of hard keys, or a manipulation load of the user increases to receive the control command with a smaller number of hard keys. In addition, the touchscreen method may have a negative effect on safe driving since a driver is required to manually touch a display provided in a dashboard to input the control command, and the gesture recognition method has a malfunction risk.

SUMMARY

The present invention provides a vehicle control device that includes a manipulating unit configured to be manipulated by a user and a vehicle having the same.

According to an aspect of the present invention, a vehicle control device may include a manipulating unit that includes an object detecting unit configured to detect an object in a noncontact manner and a pad disposed above the object detecting unit and having elasticity, and a controller configured to generate a control signal for operating a vehicle based on an output signal of the manipulating unit.

The pad may be made of a gel-like elastic body. The object detecting unit may include at least one of a capacitive proximity sensor, an ultrasonic proximity sensor, and an optical proximity sensor. The object detecting unit may also include a plurality of two-dimensionally arranged sensors. The controller may be configured to calculate a position or a height of the object on the manipulating unit based on an output signal of the object detecting unit. The manipulating unit may further include a pressure detecting unit disposed below the object detecting unit and configured to detect a pressure applied thereto.

According to another aspect of the present invention, a vehicle may include a manipulating unit that includes an object detecting unit configured to detect an object in a noncontact manner and a pad disposed above the object detecting unit and having elasticity, an audio video navigation (AVN) device including a display, and a controller configured to generate a control signal for operating the AVN device based on an output signal of the manipulating unit.

The pad may be made of a gel-like elastic body. The object detecting unit may include at least one of a capacitive proximity sensor, an ultrasonic proximity sensor, and an optical proximity sensor. The object detecting unit may also include a plurality of two-dimensionally arranged sensors. The controller may be configured to calculate a position or a height of the object on the manipulating unit based on an output signal of the object detecting unit. The manipulating unit may further include a pressure detecting unit disposed below the object detecting unit and configured to detect a pressure.

The display may be configured to display a pointing object at a position that corresponds to the position of the object on the manipulating unit. The display may also be configured to display visual properties of the pointing object differently according to the height of the object on the manipulating unit. Additionally, the display may be configured to display at least one menu button, and the controller may be configured to generate a control signal for selecting a menu button in which the pointing object is positioned among the plurality of menu buttons when the manipulating unit is pressed.

The controller may be configured to capture a user image that includes a user's hand from an output signal of the object detecting unit. The controller may then be configured to determine whether a predetermined area of the manipulating unit is covered by the user's hand based on the user image. The display may be configured to display a menu list mapped with the predetermined area when the predetermined area of the manipulating unit is covered by the user's hand. The display may also be configured to display a menu list mapped with the predetermined area when the predetermined area of the manipulating unit is covered by the user's hand for a reference time or more.

Furthermore, the display may be configured to display a reference bar that indicates a ratio of a time for which the predetermined area of the manipulating unit is covered by the user's hand relative to the reference time. The display may be configured to display a menu list mapped with the predetermined area when the predetermined area of the manipulating unit is pressed by the user's hand (e.g., pressure is applied to the predetermined area). The display may be turned off by the controller when the predetermined area of the manipulating unit is covered by the user's hand. The display may also be turned off by the controller when the predetermined area of the manipulating unit is pressed by the user's hand.

The AVN device may be turned off by the controller when the predetermined area of the manipulating unit is pressed by the user's hand. The display may then be configured to display map data to perform a navigation function. The controller may be configured to calculate an angle of a finger touching the pad based on the user image. The display may be configured to display map data to perform a navigation function. The display may also be configured to display a view angle of the map data differently according to the calculated angle of the finger. In addition, the display may be configured to display the map data according to a vertical view when the calculated angle of the finger is a reference angle or greater. The map data may also be displayed according to a top view that corresponds to the calculated angle of the finger when the calculated angle of the finger is equal to or less than a reference angle. The manipulating unit may be connected to an end of an arm rest disposed between a driver seat and a passenger seat.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
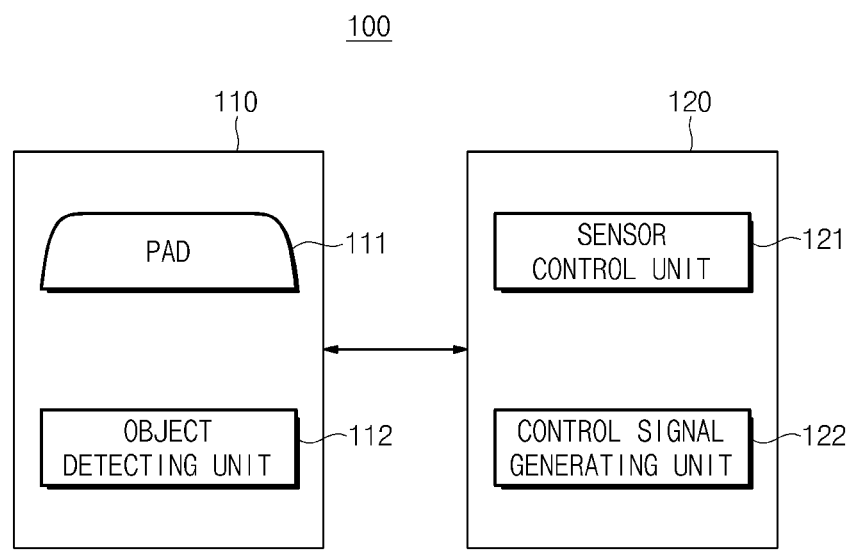
FIG. 1 is an exemplary diagram of a vehicle control device according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings, wherein like reference numerals refer to like elements throughout. Hereinafter, a vehicle control device and a vehicle having the same according to exemplary embodiments of the present invention will be described with reference to the accompanying drawings.

Figure 2:
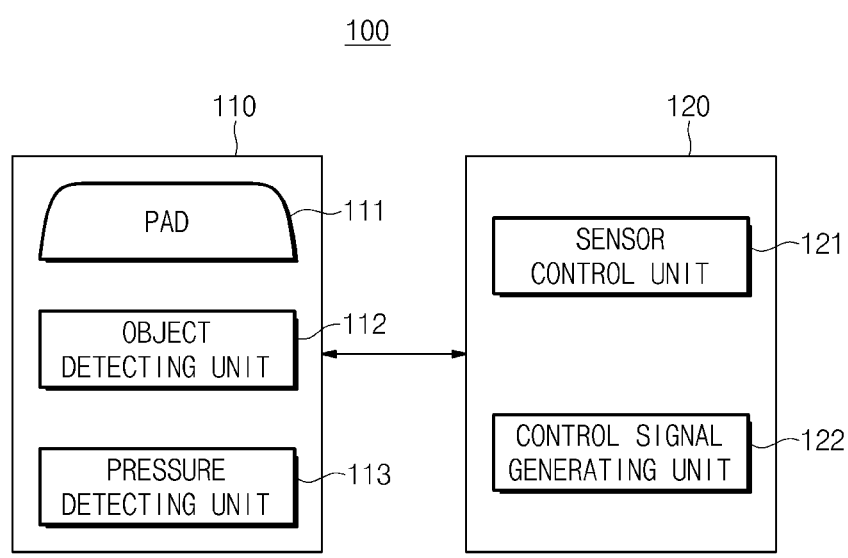
FIG. 2 is an exemplary diagram of a vehicle control device that further includes a pressure detecting unit according to an exemplary embodiment of the present invention.

FIG. 1 is an exemplary diagram of a vehicle control device according to an exemplary embodiment. FIG. 2 is an exemplary diagram of a vehicle control device that further includes a pressure detecting unit. As illustrated in FIG. 1, a vehicle control device 100 according to an exemplary embodiment may include a manipulating unit 110 configured to receive a user control command and a controller 120 configured to determine the user control command of the user based on an output signal of the manipulating unit 110 and generate a control signal that corresponds to the user control command.

The manipulating unit 110 may include a pad 111 having elasticity and an object detecting unit 112 disposed below the pad 111 and configured to detect an object in proximity to (e.g., within a predetermined distance to) the manipulating unit 110. The pad 111 may be a part onto which pressure may be applied in response to a user manipulation of the manipulating unit 110, and may be made of a transparent material having elasticity. When the pad 111 having elasticity is used, the user's manipulation feeling may improve and tactile feedback may be provided. Specifically, when manipulation may be executed on a substantially soft surface, it may be possible to obtain a softer and more natural manipulation feeling than pressing an actual button. In addition, a hand may comfortably remain thereon even when the user does not manipulate the manipulating unit 110. The pad 111 may be made of an elastic body, for example, a gel-like silicone compound and gel-like polyurethane. As the silicone compound, polydimethylsiloxane (PDMS), and the like may be used. However, the material forming the pad 111 is not limited to these materials. In addition to the above materials, any transparent material having elasticity may be used as the material forming the pad 111.

The object detecting unit 112 may be configured to detect an object within a predetermined proximity to the manipulating unit 110 in a noncontact manner. That is, the object may be detected without the manipulating unit 110 be touched (e.g., without pressure being applied to the manipulating unit 110) while a touching object may still be detected. In other words, the object detecting unit 112 may be configured to detect an object that applies pressure to the pad 111 and also an object separated from the pad 111 (e.g., noncontact detection). For this purpose, the object detecting unit 112 may include a proximity sensor. For example, at least one of a capacitive proximity sensor, an ultrasonic proximity sensor, and an optical proximity sensor may be included. The proximity sensor in this exemplary embodiment may be collectively defined as any sensor configured to detect a touching object and an object separated therefrom as long as the object is within a predetermined proximity to the sensor.

When the object detecting unit 112 includes the capacitive proximity sensor, a distance between the object and the manipulating unit 110 may be determined based on a capacitance change that differs as the object approaches the manipulating unit 110. In addition, when the object detecting unit 112 includes the ultrasonic proximity sensor, a distance between the object and the manipulating unit 110 may be determined based on an intensity of an ultrasonic signal reflected from the object and returned. When the object detecting unit 112 includes the optical proximity sensor, a distance between the object and the manipulating unit 110 may be determined based on an intensity of an optical signal reflected from the object and returned. Further, the distance between the object and the manipulating unit 110 in this exemplary embodiment may be a distance between the pad 111 and the object or a distance between the object detecting unit 112 and the object.

As will be described below, the object detecting unit 112 may have a form in which a plurality of proximity sensors are two-dimensionally arranged. When an output signal of the object detecting unit 112 is used, it may be possible to obtain an image of an object within a predetermined proximity to the manipulating unit 110 and determine a position of the object on a two-dimensional (2D) plane.

A method of the user manipulating the manipulating unit 110 may include a method of pressing the pad 111 (e.g., applying a pressure to the pad 111). When the object detecting unit 112 includes the optical proximity sensor or the ultrasonic proximity sensor, it may be possible to determine whether the pad 111 is pressed (e.g., whether pressure is applied to the pad 111) based on the output signal of the object detecting unit 112. Specifically, when the pad 111 is pressed, the an object (e.g., a user's finger) moves closer to the object detecting unit 112, and an optical characteristic may occur, for example, light may be distributed, while the pad 111 is pressed down. In addition, since a pressing operation may be performed in a substantially short amount of time (e.g., predetermined time period), when a pattern change is used, it may be possible to determine whether pressing is performed (e.g., pressure is applied) without a separate device that detects a pressure being required.

Additionally, as illustrated in FIG. 2, the manipulating unit 110 may further include a pressure detecting unit 113 configured to detect a pressure. The pressure detecting unit 113 may include a mechanical pressure sensor configured to detect a pressure using mechanical contact such as a micro switch, an electric pressure sensor configured to measure a displacement from a capacitance change between two electrodes, a semiconductor pressure sensor configured to detect a pressure using a piezoelectric effect, or a resistive film type pressure sensor configured to detect a pressure by measuring a change of a current or a resistance generated when a pressure is applied from the outside and two facing electrodes meet. However, the above pressure sensors are merely exemplary pressure sensors that may be included in the pressure detecting unit 113, and the exemplary embodiment of the vehicle control device 100 is not limited thereto.

It was previously mentioned that the position of the object within a predetermined proximity to the manipulating unit 110 may be determined from the output signal of the object detecting unit 112. Accordingly, the pressure detecting unit 113 may be configured to detect the pressure, and a position in which the pressure is detected may be determined from the output signal of the object detecting unit 112. In addition, the pressure detecting unit 113 may have a form in which a plurality of pressure sensors are two-dimensionally arranged, or may have a structure in which a pressure sensor may be configured to detect a pressure at each position defined on a 2D plane. Therefore, it may also be possible to determine a position of the manipulating unit 110 pressed by the object using an output signal of the pressure detecting unit 113.

Moreover, the object detected by the manipulating unit 110 or the object exerting pressure on the manipulating unit 110 may be the user's hand or another type of object that inputs a control command. The controller 120 may be configured to determine the user control command based on the output signal of the manipulating unit 110. The controller 120 may include a sensor controller 121 configured to operate the object detecting unit 112 or the pressure detecting unit 113 and a control signal generating unit 122 configured to generate a control signal based on the output signal of the manipulating unit 110. The sensor controller 121 and the control signal generating unit 122 may be made of a microprocessor, a micro controller, and the like.

Furthermore, components illustrated in the diagram of FIG. 1 are not physically divided but may be functionally divided. Accordingly, the sensor controller 121 and the control signal generating unit 122 may be one physical module or may be separate modules that are physically divided. In addition, either one of or both the sensor controller 121 and the control signal generating unit 122 may be provided in the manipulating unit 110, or both the sensor controller 121 and the control signal generating unit 122 may be separately provided extraneously to the manipulating unit 110.

Figure 3:
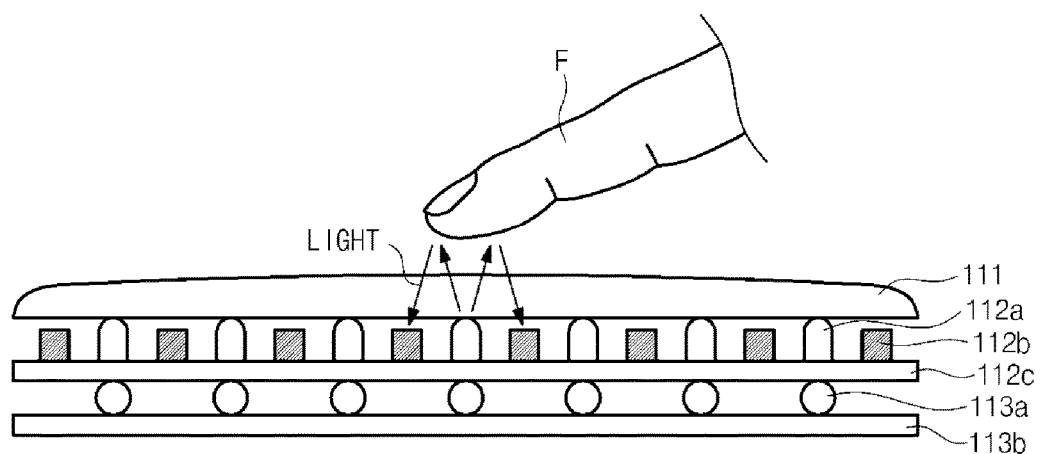
FIG. 3 is an exemplary side view of a structure of a manipulating unit according to an exemplary embodiment of the present invention.
Figure 4:
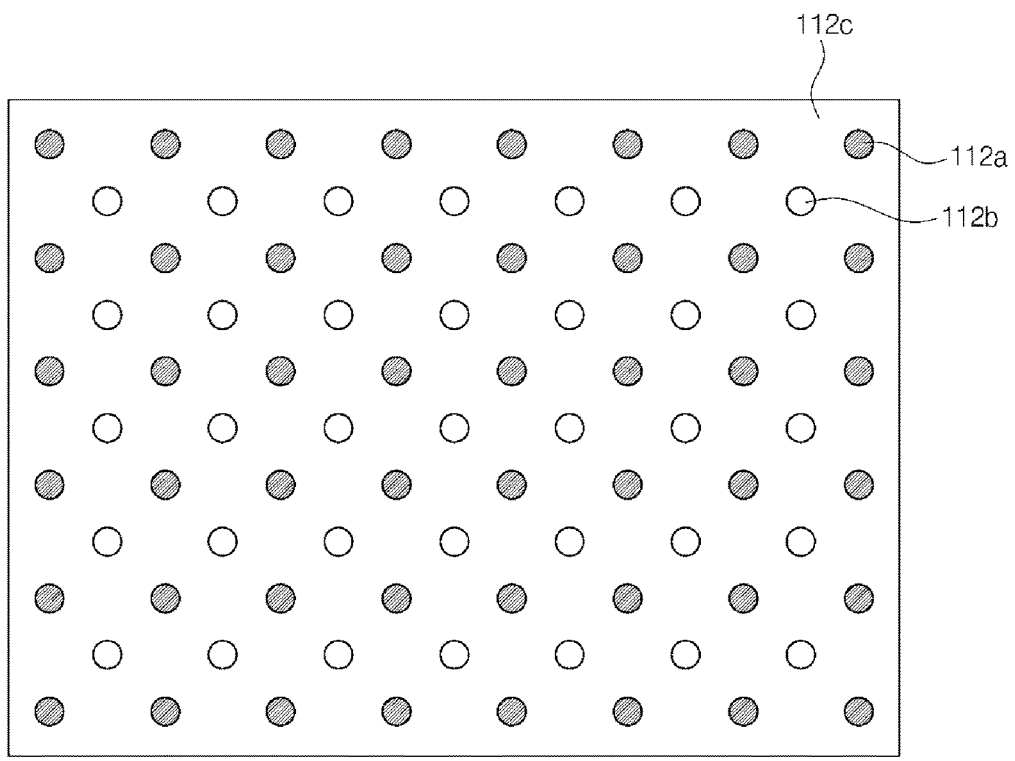
FIG. 4 is an exemplary plan view of a manipulating unit seen from the top according to an exemplary embodiment of the present invention.

FIG. 3 is an exemplary side view of a structure of a manipulating unit according to an exemplary embodiment. FIG. 4 is an exemplary plan view of a manipulating unit seen from the top (e.g., a top view) according to an exemplary embodiment. In this example, the object detecting unit 112 of the manipulating unit 110 may include the optical proximity sensor. As illustrated in FIG. 3, the object detecting unit 112 may include a plurality of light emitting units 112a and a plurality of light receiving units 112b. The light emitting unit 112a may be an infrared light emitting diode (LED) and the light receiving unit 112b may be a phototransistor configured to detect infrared light.

When the light emitting unit 112a is implemented by the infrared LED, an infrared filter, which may be configured to prevent infrared light generated from other external light source other than infrared light generated from the light emitting unit 112a from being incident on the light receiving unit 112b, may be provided between the pad 111 and the object detecting unit 112. As illustrated in FIG. 4, the plurality of light emitting units 112a and the plurality of light receiving units 112b may be two-dimensionally arranged on a substrate 112c. The plurality of light emitting units 112a may be connected in the form of a matrix, and may be individually turned on and off. The phototransistors 112b may be connected in parallel and operated as a type of optical sensor having a substantially wide surface.

The pressure detecting unit 113 may also include a plurality of pressure sensors 113a that are two-dimensionally arranged on a substrate 113b or a spacer that two-dimensionally divides a space between two facing conductive films. However, a configuration of FIG. 4 is merely an example of the manipulating unit 110. As described above, the pressure detecting unit 113 may not be included in the manipulating unit 110.

Figure 5:
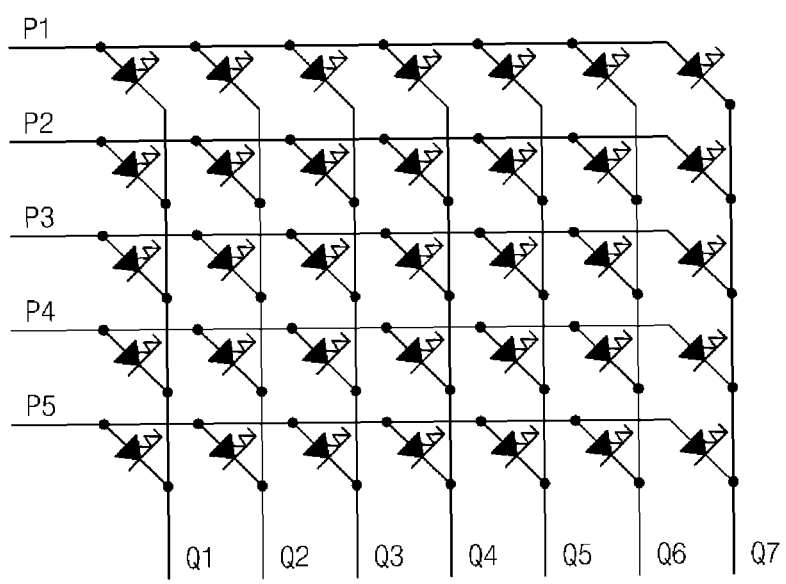
FIG. 5 is an exemplary circuit diagram of an LED matrix of an object detecting unit according to an exemplary embodiment of the present invention.
Figure 6:
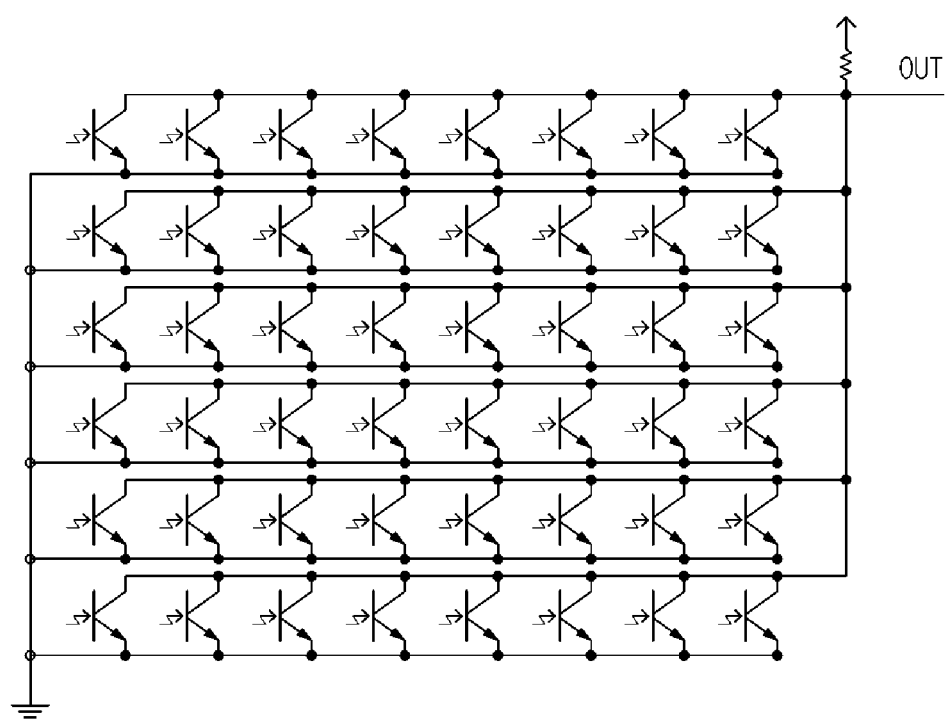
FIG. 6 is an exemplary circuit diagram of a phototransistor array of an object detecting unit according to an exemplary embodiment of the present invention.

FIG. 5 is an exemplary circuit diagram of an LED matrix of an object detecting unit. FIG. 6 is an exemplary circuit diagram of a phototransistor array of an object detecting unit. As illustrated in FIG. 5, P1 to P5 and Q1 to Q7 represent digital output pins of the sensor controller 121. A desired LED may be turned on by appropriately adjusting these outputs. For example, to turn an LED in a third row and a second column on, the sensor controller 121 may be configured to adjust the output such that P1=P2=P4=P5=0, P3=1, Q1=Q3=Q4=Q5=Q6=Q7=1, and Q2=0. In this manner, it may be possible to turn on one LED at a time, sequentially.

As illustrated in FIG. 6, all phototransistors may be connected in parallel, and a current passing therethrough may flow through a resistance on the top. Accordingly, an output signal (OUT) output through the output pin of the phototransistor array may maintain a value approximate to a power supply voltage VCC when there is no light, and when light is incident on the phototransistor array, a voltage may decrease in proportion to an amount thereof. The output signal of the phototransistor may be input to the control signal generating unit 122. Based on a position of the LED that is turned on by the sensor controller 121 and the output signal of the phototransistor, the control signal generating unit 122 may be configured to calculate the object near (e.g., within a predetermined proximity to) the manipulating unit 110, for example, a position of the user's hand or finger, a distance to the manipulating unit 110, and an area. Details thereof will be described below.

The structures illustrated in FIGS. 5 and 6 are merely examples that may be applied to the exemplary embodiment of the vehicle control device 100, but the exemplary embodiment of the vehicle control device 100 is not limited thereto. Accordingly, in addition to the structures illustrated in FIGS. 5 and 6, any structure in which the user's hand or finger within a predetermined proximity to the manipulating unit 110 is detected and a position, a distance, an area thereof, and the like may be calculated may be applied to the manipulating unit 110.

Figure 7:
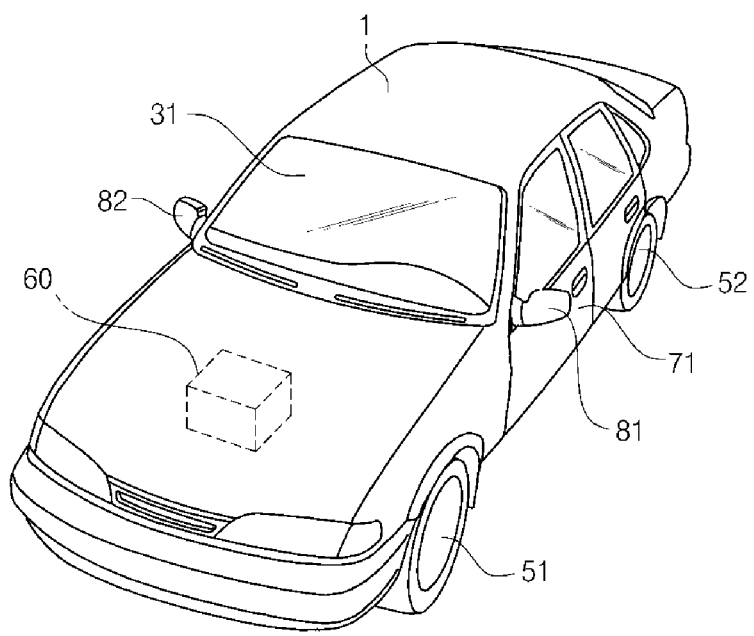
FIG. 7 is an exemplary diagram illustrating an appearance of a vehicle according to an exemplary embodiment of the present invention.
Figure 8:
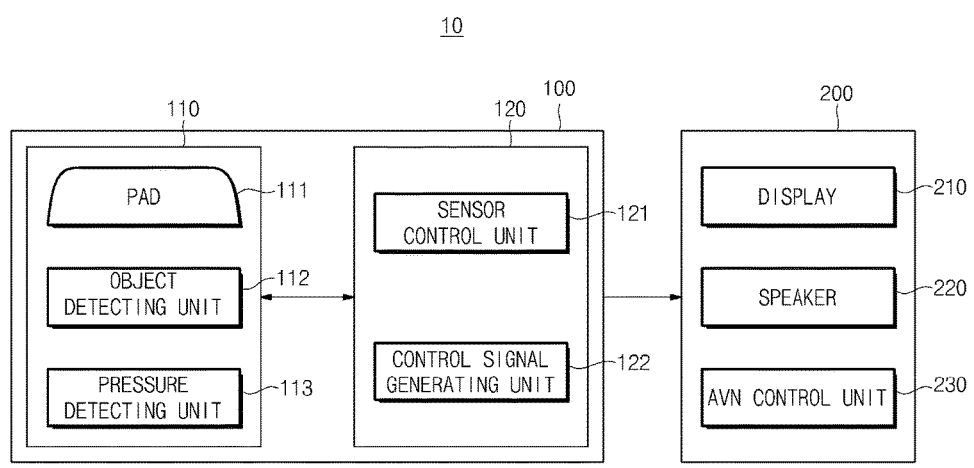
FIG. 8 is an exemplary block diagram of the vehicle according to the exemplary embodiment of the present invention.

Hereinafter, an exemplary embodiment of a vehicle in which the vehicle control device 100 is installed and an operation of the vehicle control device 100 will be described. FIG. 7 is an exemplary diagram illustrating an appearance of a vehicle according to an exemplary embodiment. FIG. 8 is an exemplary diagram of the vehicle according to the exemplary embodiment.

As illustrated in FIG. 7, a vehicle 10 according to an exemplary embodiment may include a main body 1 that forms an appearance of the vehicle 10, a plurality of wheels 51 and 52 configured to move the vehicle 10, a driving device 60 configured to rotate the wheels 51 and 52, a plurality of doors 71 and 72 (refer to FIG. 9) configured to shield an inside of the vehicle 10 from the exterior, a front glass 31 configured to provide a field of view in front of the vehicle 10 to a driver in the vehicle 10, and a plurality of side mirrors 81 and 82 configured to provide a field of view behind the vehicle 10 to the driver.

The wheels 51 and 52 may include the front wheels 51 disposed in the front of the vehicle and the rear wheels 52 disposed in the rear of the vehicle. The driving device 60 may be configured to provide rotary power to the front wheels 51 or the rear wheels 52 to move the main body 1 forward or backward. The driving device 60 may include an engine configured to combust fossil fuels and generate rotary power or a motor configured to receive power from a condenser (not illustrated) and generate rotary power. The doors 71 and 72 may be pivotally disposed on left and right sides of the main body 1. When the doors are opened, the driver may enter the vehicle 10. When the doors are closed, the doors may shield the inside of the vehicle 10 from the exterior. The front glass 31 may be disposed in the upper front of the main body 1 and enables the driver in the vehicle 10 to obtain visual information from the front of the vehicle 10, and may also be called a windshield glass.

Additionally, the side mirrors 81 and 82 may include the left side mirror 81 disposed on the left side of the main body 1 and the right side mirror 82 disposed on the right side thereof. The side mirrors 81 and 82 allow the driver in the vehicle 10 to obtain visual information from the sides and rear of the vehicle 10. The vehicle 10 may further include a detecting device such as a proximity sensor configured to detect obstacles at the side or rear thereof or another vehicle, and a rain sensor configured to detect rainfall and precipitation.

As illustrated in FIG. 8, the vehicle 10 according to the exemplary embodiment may include the vehicle control device 100 and an audio video navigation (AVN) device 200. The AVN device 200 may be a device configured to integrally execute an audio function, a video function, and a navigation function, and additional functions such as initializing a telephone call in addition to the above functions. A configuration of the vehicle control device 100 is the same as in the above description. The AVN device 200 may include a display 210 configured to visually output information for executing various functions, a speaker 220 configured to audibly output the information, and an AVN controller 230 configured to generally operate the AVN device 200.

Figure 9:
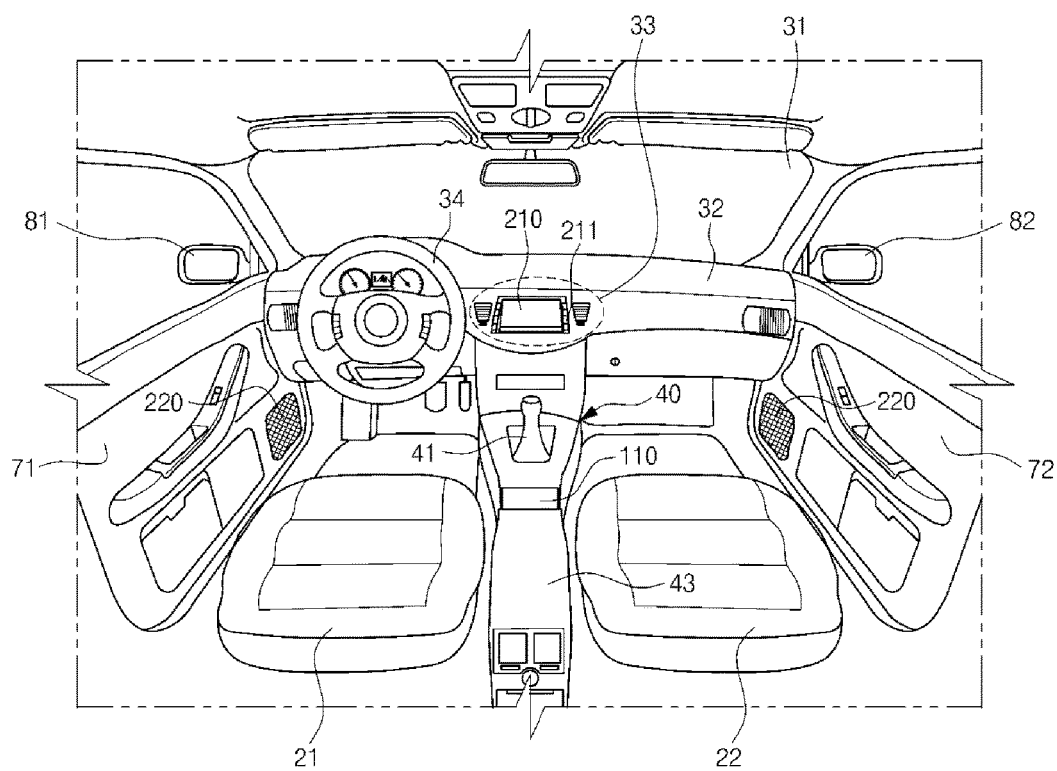
FIG. 9 is an exemplary diagram illustrating an appearance of a vehicle control device provided in the vehicle seen from a back seat according to an exemplary embodiment of the present invention.
Figure 10:
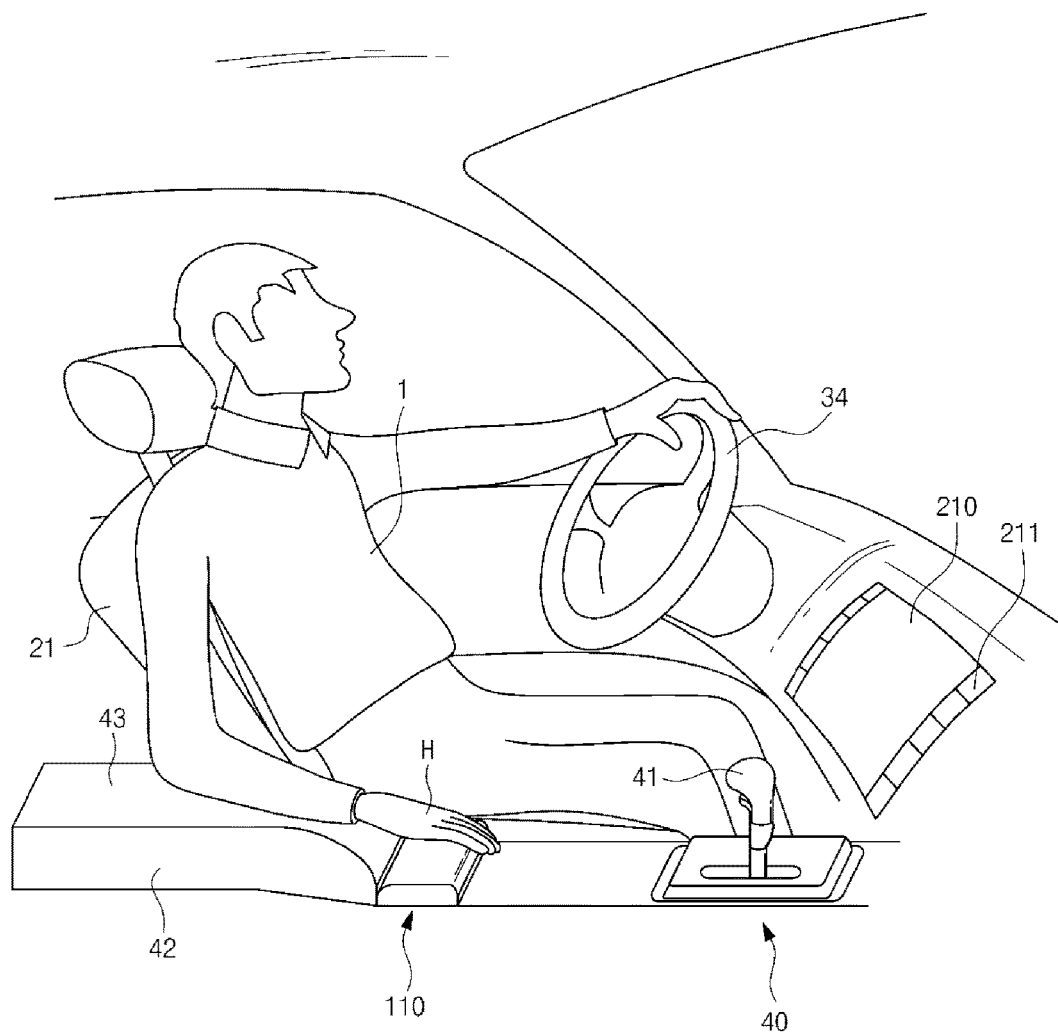
FIG. 10 is an exemplary diagram illustrating an appearance of the vehicle control device provided in the vehicle seen from a passenger seat according to an exemplary embodiment of the present invention.

Hereinafter, specific operations will be described with reference to appearances of the vehicle control device 100 and the AVN device 200 which may be installed inside the vehicle 10. FIG. 9 is an exemplary diagram illustrating an appearance of a vehicle control device disposed within the vehicle seen from a back seat. FIG. 10 is an exemplary diagram illustrating an appearance of the vehicle control device disposed within the vehicle seen from a passenger seat.

As illustrated in FIGS. 9 and 10, the display 210 may be installed in a center fascia 33, that is, a center area of a dashboard 32, and may be configured to display an audio screen, a video screen, a navigation screen, and a screen necessary for executing various other functions performed by the AVN device 200. The display 210 may be implemented by a liquid crystal display (LCD), a light emitting diode (LED), a plasma display panel (PDP), an organic light emitting diode (OLED), a cathode ray tube (CRT), and the like.

The manipulating unit 110 may be disposed in a center console 40 between a driver seat 21 and a passenger seat 22. The center console 40 may be an area between the driver seat 21 and the passenger seat 22 and in which a gear lever 41 and a console box 42, that is, a storage space for accommodating goods may be formed. For example, the manipulating unit 110 may be disposed in an extended form in a front end of an arm rest 43 above the console box 42.

In general, to operate the AVN device 200, the user may manipulate a hard key 211 disposed in the vicinity of the display 210, a jog shuttle disposed in the center console 40, or a hard key disposed in the center console 40. Due to this manipulation, the driving user may have a bad posture, which may influence safe driving, a substantially wide space may be required to provide a plurality of hard keys, or the hard key or the jog shuttle may be required to be manipulated multiple times to input a desired control command. However, in the vehicle 10 according to the exemplary embodiment, the user in the front seat 21 or 22 may more stably manipulate the manipulating unit 110 using a hand (H) or other object while resting an arm on the arm rest 43.

Since the pad 111 may be disposed on the uppermost part of the manipulating unit 110, the user may input a control command using the pad 111. As described above, since the pad 111 may be made of a material having elasticity, manipulation feeling of the user may be improved, and the hand may comfortably remain on the pad 111 even when no control command is input. In addition, as will be described below, a hot key function may be executed by displaying a desired menu screen of the user on the display 210 with simplified manipulation.

Moreover, a position in which the vehicle control device 100 is installed is not limited to that of the example of FIGS. 9 and 10. The vehicle control device 100 may be installed in an arm rest of the back seat and a control command may be input from a passenger seating on the back seat. A plurality of vehicle control devices 100 may be disposed within the vehicle 10 such that one is installed in the center console 40 as exemplified in FIGS. 9 and 10 and another is installed in the arm rest of the back seat.

Figure 11:
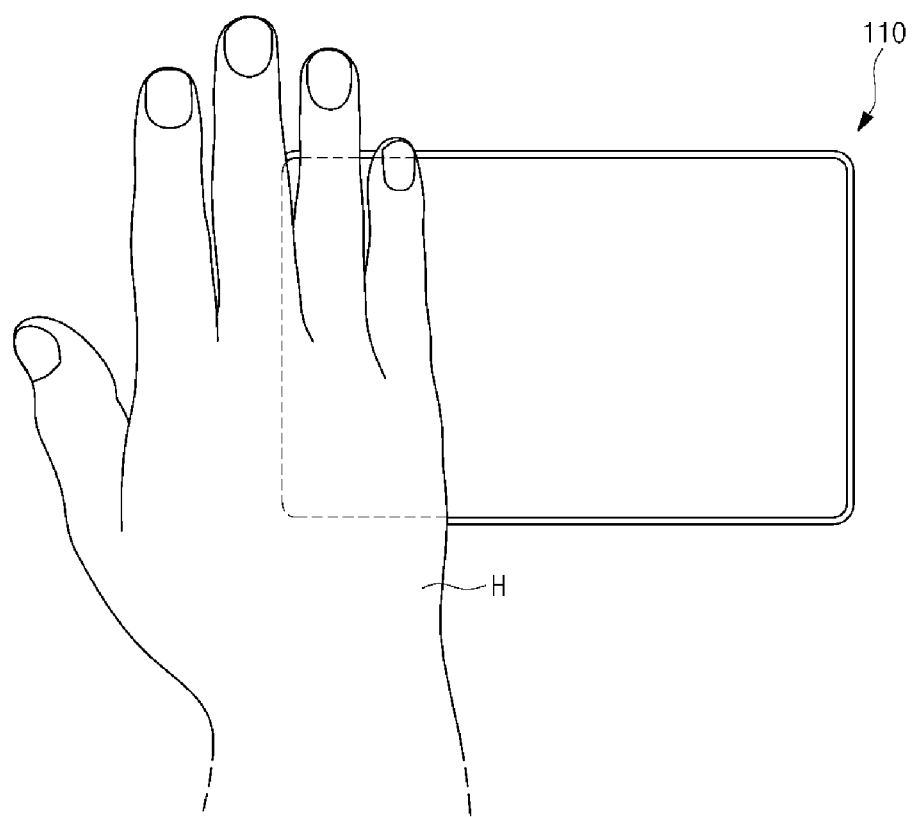
FIG. 11 is an exemplary diagram illustrating a user manipulation a manipulating unit according to an exemplary embodiment of the present invention.
Figure 12:
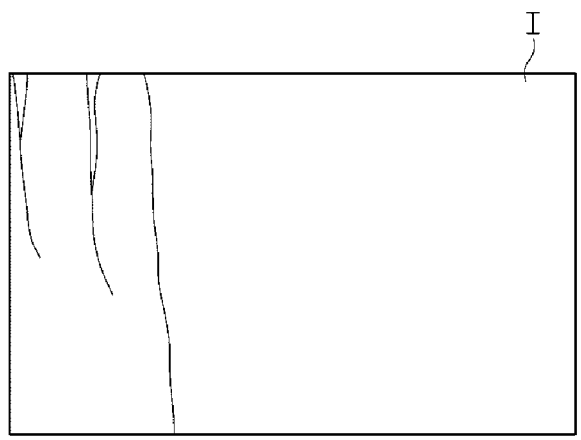
FIG. 12 is an exemplary diagram illustrating a user image formed by an output signal of an object detecting unit when the user manipulates the manipulating unit as illustrated in FIG. 11 according to an exemplary embodiment of the present invention.

FIG. 11 is an exemplary diagram illustrating a user manipulation of a manipulating unit. FIG. 12 is an exemplary diagram illustrating a user image formed by an output signal of an object detecting unit when the user manipulates the manipulating unit as illustrated in FIG. 11.

A manipulating method in which, for example, the user's hand or other object covers or presses a predetermined area of the manipulating unit 110, or the user's finger presses the manipulating unit 110, may be set as a method of inputting a control command. Therefore, when a control command that corresponds to each manipulating method is previously mapped and the user inputs the control command, the control signal generating unit 122 may be configured to generate a control signal corresponding thereto.

Furthermore, when each predetermined area of the manipulating unit 110 is mapped with a control command corresponding thereto and the user's hand covers or presses the predetermined area (e.g., pressure is applied to the predetermined area by an object), the control command mapped to the corresponding area may be executed. Hereinafter, a detailed exemplary embodiment will be described. For example, as illustrated in FIG. 11, the control command may be input by covering a left end of the manipulating unit 110. When the object detecting unit 112 includes the optical proximity sensor as described above, each output signal output from the plurality of phototransistors 112b of the object detecting unit 112 may be a pixel value that forms a single image. In the exemplary embodiment to be described below, the image formed by the output signal of the object detecting unit 112 may be called a user image.

When the phototransistor array of the object detecting unit 112 may have a circuit structure as illustrated in FIG. 6, a collector voltage of the phototransistor may be output. Therefore, as an amount of LED reflection light incident on the phototransistor increases, the output of the phototransistor array may decrease, and as an amount of LED reflection light incident on the phototransistor decreases, the output of the phototransistor array may increase. When a pixel is set to express white when the output of the phototransistor is a largest output and a pixel is set to express black when the output of the phototransistor is a smallest output, when the manipulating unit 110 is manipulated as illustrated in FIG. 11, the user image (I) as illustrated in FIG. 12 may be obtained.

When the user image (I) as illustrated in FIG. 12 is obtained, the control signal generating unit 122 may be configured to determine that the left end of the manipulating unit 110 is covered and may be configured to generate a control signal that corresponds thereto. To determine whether an object covering the left end of the manipulating unit 110 is a user's hand (H), an image recognition algorithm may be applied. For this purpose, the control signal generating unit 122 may be configured to store morphological features of a human hand in advance and determine whether the object shown in the user image (I) is the hand. Through this process, mistakenly considering positioning of other human parts such as the user's arm or wrist on the manipulating unit 110 as an input of the control command may be filtered.

Figure 13:
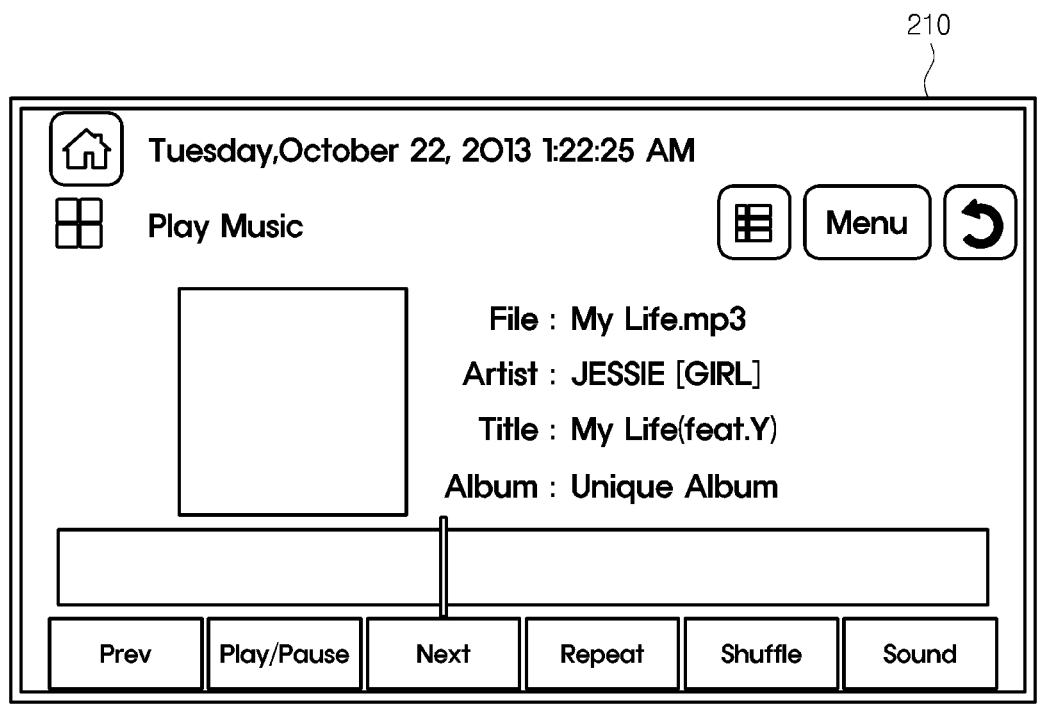
FIG. 13 is an exemplary diagram illustrating an audio reproducing screen displayed on a display of an audio video navigation (AVN) device according to an exemplary embodiment of the present invention.
Figure 14:
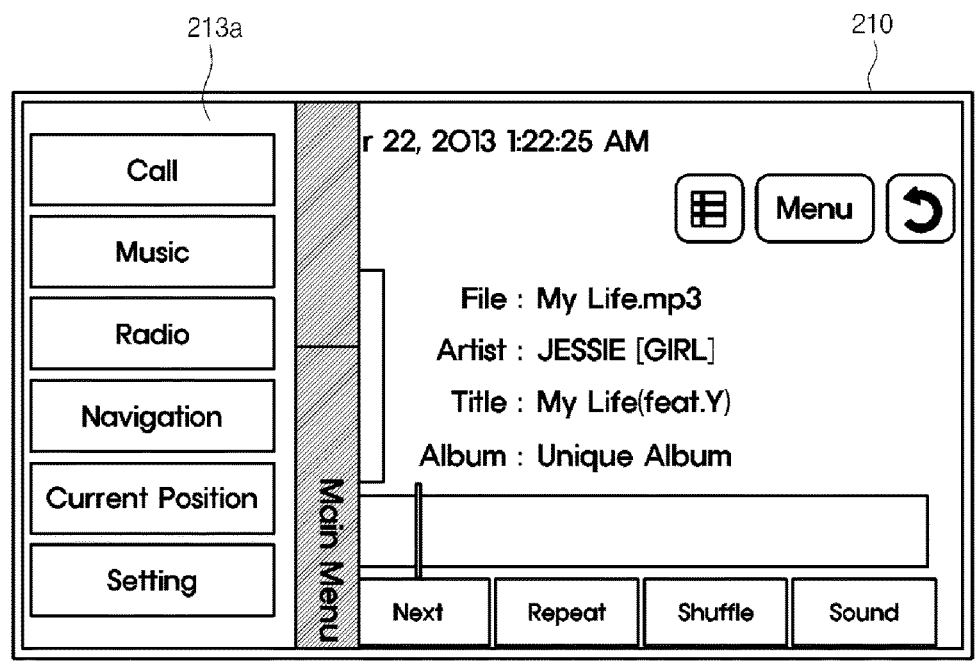
FIG. 14 is an exemplary diagram illustrating a screen displayed on the display of the AVN device based on the user manipulation according to an exemplary embodiment of the present invention.
Figure 15:
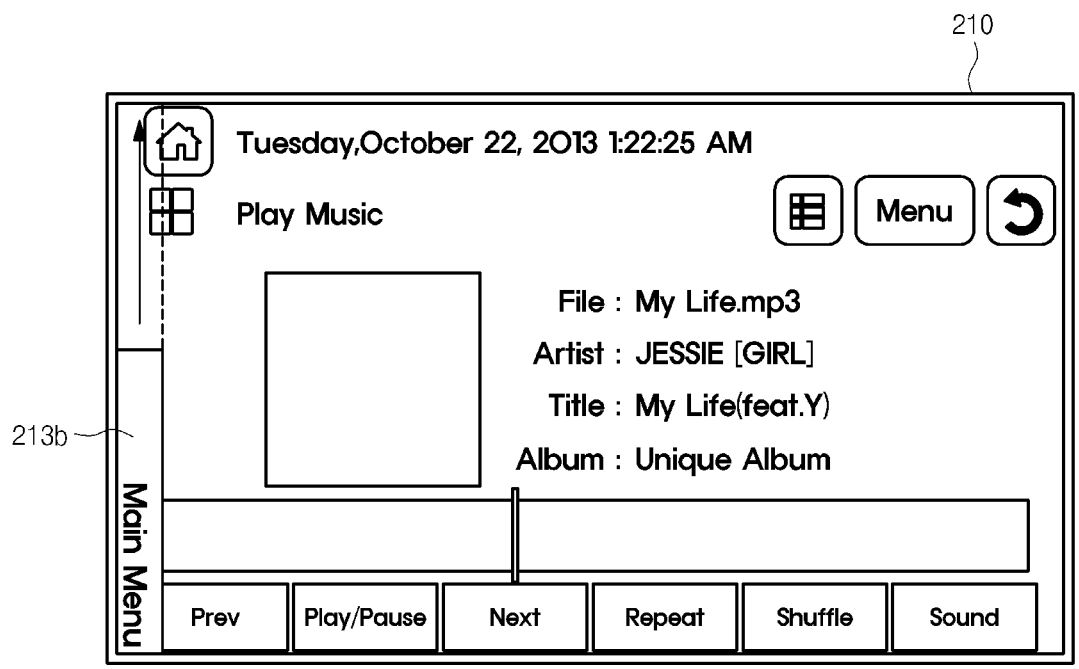
FIG. 15 is an exemplary diagram illustrating a ratio of the user manipulating time relative to a reference time according to an exemplary embodiment of the present invention.

FIG. 13 is an exemplary diagram illustrating an exemplary audio reproducing screen displayed on a display of an audio video navigation (AVN) device. FIG. 14 is an exemplary diagram illustrating an exemplary screen displayed on the display of the AVN device according to the user's manipulation. FIG. 15 is an exemplary diagram illustrating a ratio of the user's manipulating time relative to a reference time. For example, the manipulating method described in FIG. 11 may be mapped with a hot key function browsing a main menu. The hot key function may be a function capable of directly calling a desired function regardless of functions currently performed by the AVN device 200. For example, as illustrated in FIG. 13, while the audio reproducing screen is displayed on the display 210, when the user's hand (H) covers the left end of the manipulating unit 110 as illustrated in FIG. 11, a main menu list 213a may be displayed on a part of the display 210 as illustrated in FIG. 14.

Specifically, when the user's hand covers the left end of the manipulating unit 110, the user image (I) as illustrated in FIG. 12 may be obtained by the output signal of the object detecting unit 112, and the control signal generating unit 122 may be configured to determine that the user's hand (H) covers the left end of the manipulating unit 110 based on the user image (I). Manipulation of covering the left end of the manipulating unit 110 with the user's hand (H) may be mapped with a control command for accessing the main menu. The control signal generating unit 122 may be configured to generate a control signal for accessing the main menu, and may be configured to transmit the signal to the AVN controller 230 of the AVN device 200. In addition, the AVN controller 230 may be configured to operate to display the main menu list 213a on the display 210 as illustrated in FIG. 14.

Meanwhile, to distinguish the manipulation for the control command from other operations, when the user's hand covers the left end of the manipulating unit 110 for a reference time or greater, the control signal generating unit 122 may be configured to generate a control signal for accessing the main menu. For this purpose, the reference time may be set in advance, and information regarding an amount of remaining time to reach the reference time may be provided to the user.

For example, as illustrated in FIG. 15, a reference bar 213b that indicates a ratio of a time for which the user's hand covers the left end of the manipulating unit 110 relative to the reference time may be displayed on the display 210. A height of the reference bar 213b may differ over time. The height may gradually increase from the bottom of the display 210 at the beginning. Then, when the reference time is reached, the height of the reference bar 213b may reach the top of the display 210, and the main menu list 213a may be displayed as illustrated in FIG. 14. The user may determine an amount of time to maintain an object or hand over the manipulating unit while viewing the reference bar 213b illustrated in FIG. 15. When the user does not desire to access the main menu, an operation of covering the manipulating unit 110 may be stopped before the reference time is reached, and the control command for accessing the main menu may be canceled.

Additionally, when the user desires to directly access the main menu without waiting for the reference time to be reached, the pad 111 may be directly pressed to access the main menu immediately while the hand covers the left end of the manipulating unit 110. In particular, the pressure detecting unit 113 may be configured to detect the pressure applied to the pad 111. When the output signal of the pressure detecting unit 113 indicates the press of the left end of the manipulating unit 110, the control signal generating unit 122 may be configured to generate a control signal for directly accessing the main menu without waiting for the reference time to be reached and may be configured to transmit the signal to the AVN controller 230. In addition, when the manipulating unit 110 does not include a pressure detecting unit 113 as described above, it may be possible to determine whether the manipulating unit 110 is pressed using the output signal of the object detecting unit 112.

Figure 16:
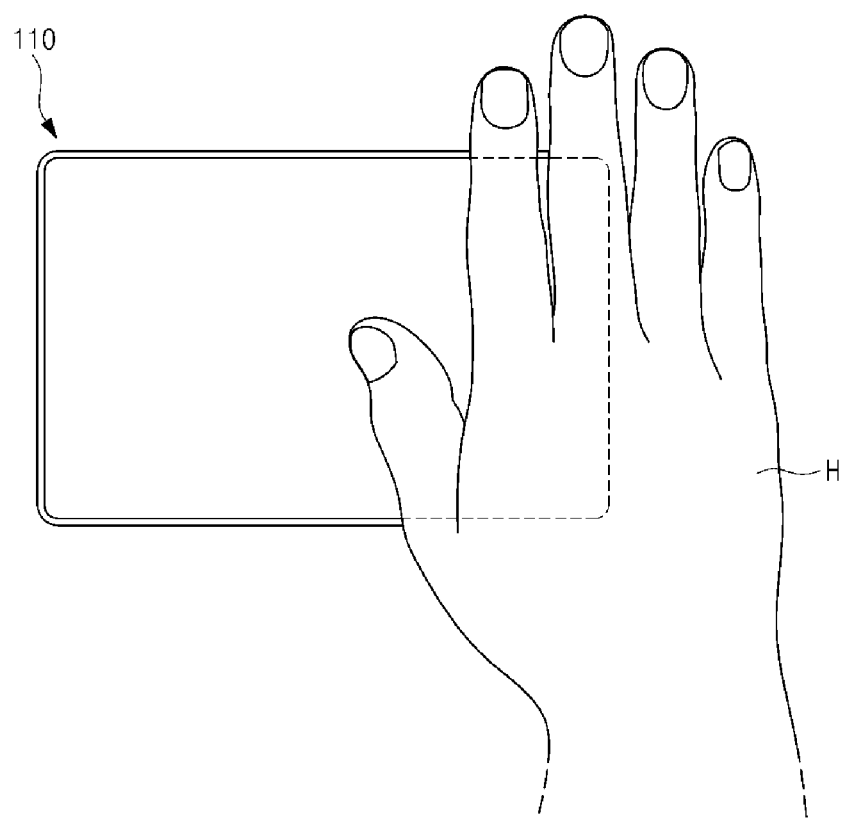
FIG. 16 is an exemplary diagram illustrating a user manipulation of the manipulating unit according to an exemplary embodiment of the present invention.
Figure 17:
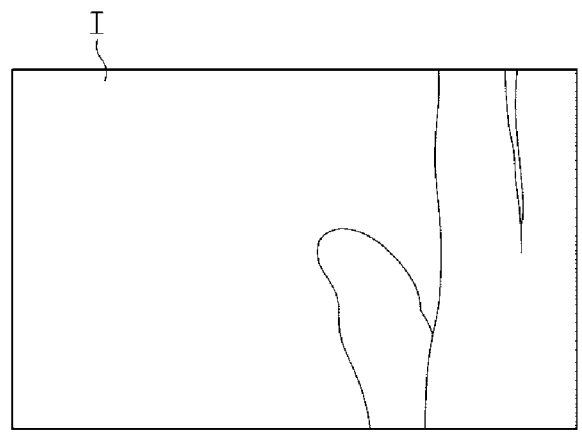
FIG. 17 is an exemplary diagram illustrating an exemplary user image formed by an output signal of an object detecting unit when the user manipulates the manipulating unit as illustrated in FIG. 16 according to an exemplary embodiment of the present invention.

FIG. 16 is an exemplary diagram illustrating another user manipulation of the manipulating unit. FIG. 17 is an exemplary diagram illustrating an exemplary user image formed by an output signal of an object detecting unit when the user manipulates the manipulating unit as illustrated in FIG. 16. As illustrated in FIG. 16, the control command may also be input using a method in which the user's hand (H) covers a right end of the manipulating unit 110. When the object detecting unit 112 includes the optical proximity sensor as described above, each output signal output from the plurality of phototransistors 112b of the object detecting unit 112 may be a pixel value configured to form a single image.

When the phototransistor array of the object detecting unit 112 has the circuit structure as illustrated in FIG. 16, a collector voltage of the phototransistor may be output. Therefore, as an amount of LED reflection light incident on the phototransistor increases, the output of the phototransistor array decreases, and as an amount of LED reflection light incident on the phototransistor decreases, the output of the phototransistor array increases. When a pixel is set to express white when the output of the phototransistor is a largest output and a pixel is set to express black when the output of the phototransistor is a smallest output, when the user manipulates the manipulating unit 110 as illustrated in FIG. 16, the user image (I) as illustrated in FIG. 17 may be obtained.

The control signal generating unit 122 may be configured to determine whether the object within a predetermined proximity to the above of the manipulating unit 110 is the hand by applying an image recognition algorithm to the user image (I). When the object shown in the user image (I) is the user's hand and the user's hand covers the right end of the manipulating unit 110, a control signal corresponding thereto may be generated. Additionally, in the examples of FIGS. 12 and 16, to distinguish the manipulation for the control command from manipulation for inputting other control commands or the user's operation independent from the control command, when the user's hand covers a reference area of the left or right end of the manipulating unit 110, a control signal corresponding thereto may be generated. The reference area may be previously set to have a predetermined range.

Moreover, when the object shown in the image is the hand, it may be possible to determine whether a corresponding hand is the driver's hand or the passenger's hand seated on the passenger seat 22 using an arrangement order of fingers. This determination result may be used to perform a lock function on manipulating authority of the vehicle control device 100. When the lock function that provides the manipulating authority of the vehicle control device 100 to the driver is set, the control signal generating unit 122 may be configured to generate a control signal when the hand shown in the user image (I) is the driver's hand and transmit the signal to the AVN device 200.

Figure 18:
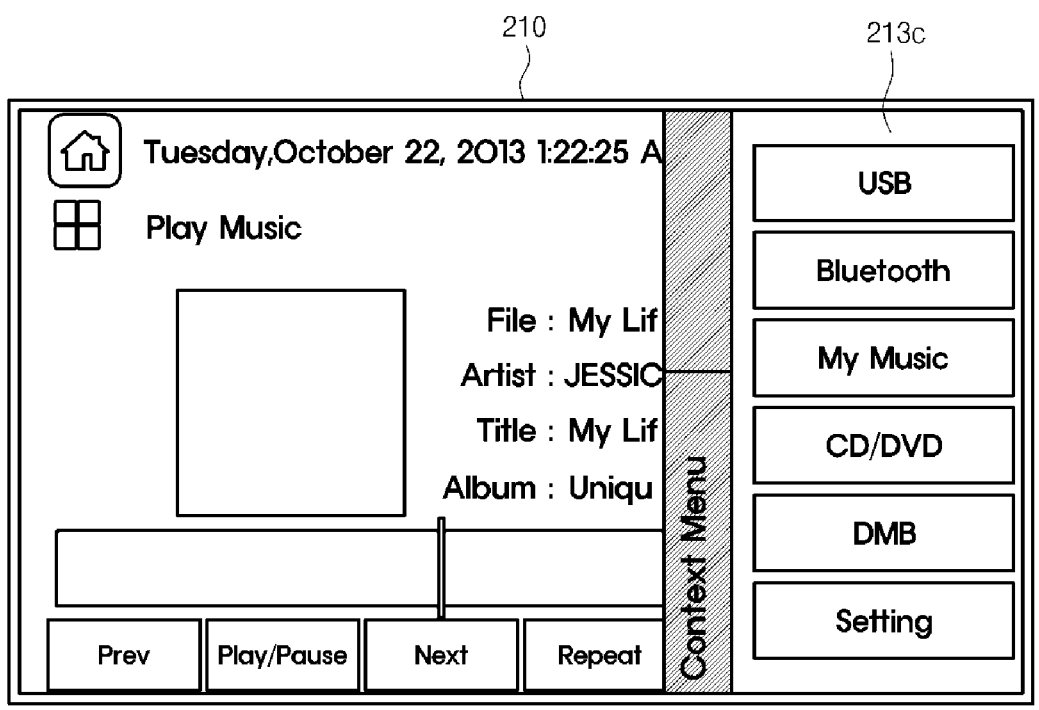
FIG. 18 is an exemplary diagram illustrating another screen displayed on the display of the AVN device based on the user manipulation according to an exemplary embodiment of the present invention.
Figure 19:
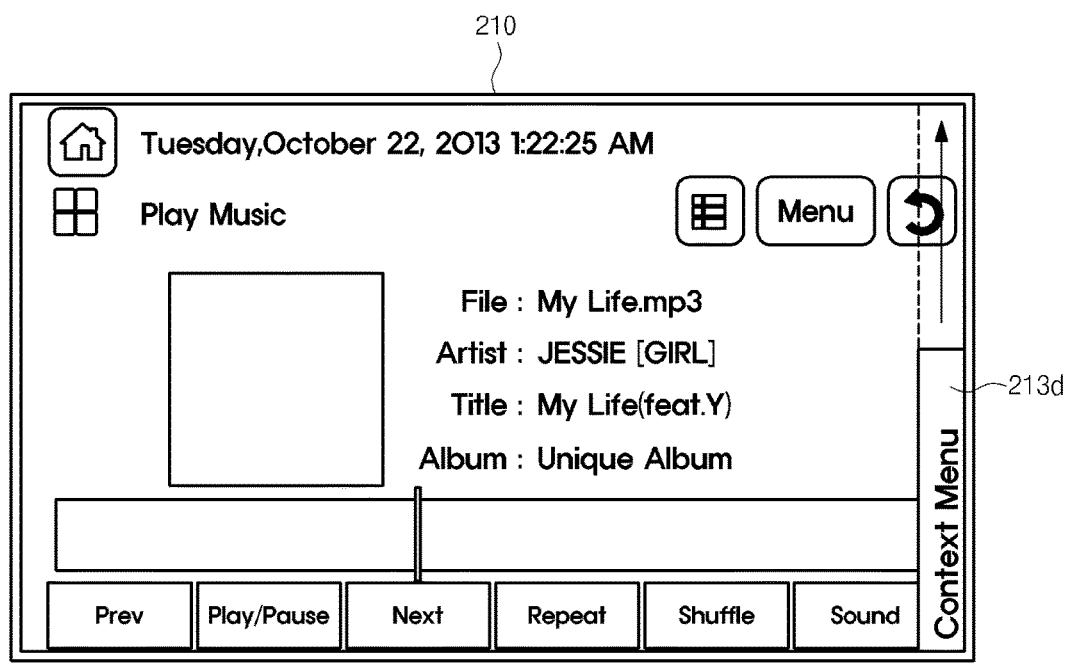
FIG. 19 is an exemplary diagram illustrating a ratio of the user manipulating time relative to a reference time according to an exemplary embodiment of the present invention.

FIG. 18 is an exemplary diagram illustrating another exemplary screen displayed on the display of the AVN device according to the user's manipulation. FIG. 19 is an exemplary diagram illustrating a ratio of the user's manipulating time relative to a reference time. For example, the manipulating method described in FIG. 16 may be mapped with a hot key function for browsing a context menu as illustrated in FIG. 18. Items of an USB, Bluetooth, and the like may be displayed in a context menu list 213c in the example of FIG. 18, but these are merely examples. Various items other than the items displayed in FIG. 18 may also be displayed in the context menu list 213c.

Meanwhile, in this case, to distinguish the manipulation for the control command from other operations, when the user's hand (H) covers the right end of the manipulating unit 110 for the reference time or greater, the control signal generating unit 122 may be configured to generate a control signal for accessing the context menu. For this purpose, the reference time may be set in advance, and information regarding how much time is left to reach the reference time may be provided to the user. Here, the reference time may be set the same as or set differently from the reference time applied to access the main menu.

For example, as illustrated in FIG. 19, a reference bar 213d that indicates a ratio of a time for which the user's hand covers the right end of the manipulating unit 110 relative to the reference time may be displayed on the display 210. A height of the reference bar 213d may differ over time. The height may gradually increase from the bottom of the display 210 at the beginning. Then, when the reference time is reached, the height of the reference bar 213d may reach a top of the display 210, and the context menu list 213c may be displayed as illustrated in FIG. 18. The user may determine an amount of time to maintain a hand in place while viewing the reference bar 213d illustrated in FIG. 19. When the user does not desire to access the context menu, an operation of covering the manipulating unit 110 may be stopped before the reference time is reached, and the control command for accessing the context menu may be canceled.

In addition, when the user desires to directly access the context menu without waiting for the reference time to be reached, the pad 111 may be directly pressed to access the context menu immediately while the hand covers the right end of the manipulating unit 110. In particular, the pressure detecting unit 113 may be configured to detect the pressure applied to the pad 111. When the output signal of the pressure detecting unit 113 indicates the press of the right end of the manipulating unit 110, the control signal generating unit 122 may be configured to generate a control signal for directly accessing the context menu without waiting for the reference time to be reached and may be configured to transmit the signal to the AVN controller 230. Further, when the manipulating unit 110 does not include a pressure detecting unit 113 as described above, it may be possible to determine whether the manipulating unit 110 is pressed using the output signal of the object detecting unit 112.

Figure 20:
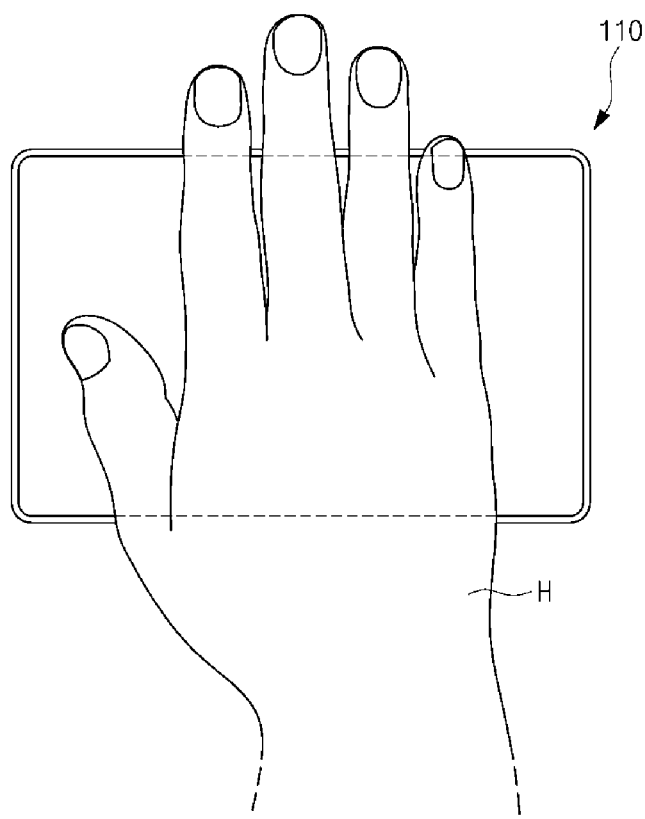
FIG. 20 is an exemplary diagram illustrating of a user manipulation of the manipulating unit according to an exemplary embodiment of the present invention.
Figure 21:
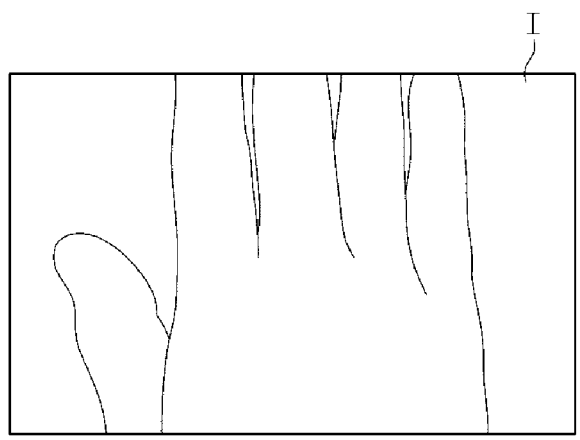
FIG. 21 is an exemplary diagram illustrating an image formed by an output signal of an object detecting unit when the user manipulates the manipulating unit as illustrated in FIG. 20 according to an exemplary embodiment of the present invention.

FIG. 20 is an exemplary diagram illustrating still another user manipulation of the manipulating unit. FIG. 21 is an exemplary diagram illustrating an image formed by an output signal of an object detecting unit when the user manipulates the manipulating unit as illustrated in FIG. 20. As illustrated in FIG. 20, the control command may also be input using a method in which the user's hand covers a center portion of the manipulating unit 110. When the object detecting unit 112 includes the optical proximity sensor, each output signal output from the plurality of phototransistors 112b of the object detecting unit 112 may be a pixel value configured to form a single image as described above.

When the phototransistor array of the object detecting unit 112 has the circuit structure as illustrated in FIG. 5, a collector voltage of the phototransistor may be output. Therefore, as an amount of LED reflection light incident on the phototransistor increases, the output of the phototransistor array decreases, and as an amount of LED reflection light incident on the phototransistor decreases, the output of the phototransistor array increases. If a pixel is set to express white when the output of the phototransistor is a largest output and a pixel is set to express black when the output of the phototransistor is a smallest output, when the user manipulates the manipulating unit as illustrated in FIG. 20, the user image (I) as illustrated in FIG. 21 may be obtained.

Figure 22:
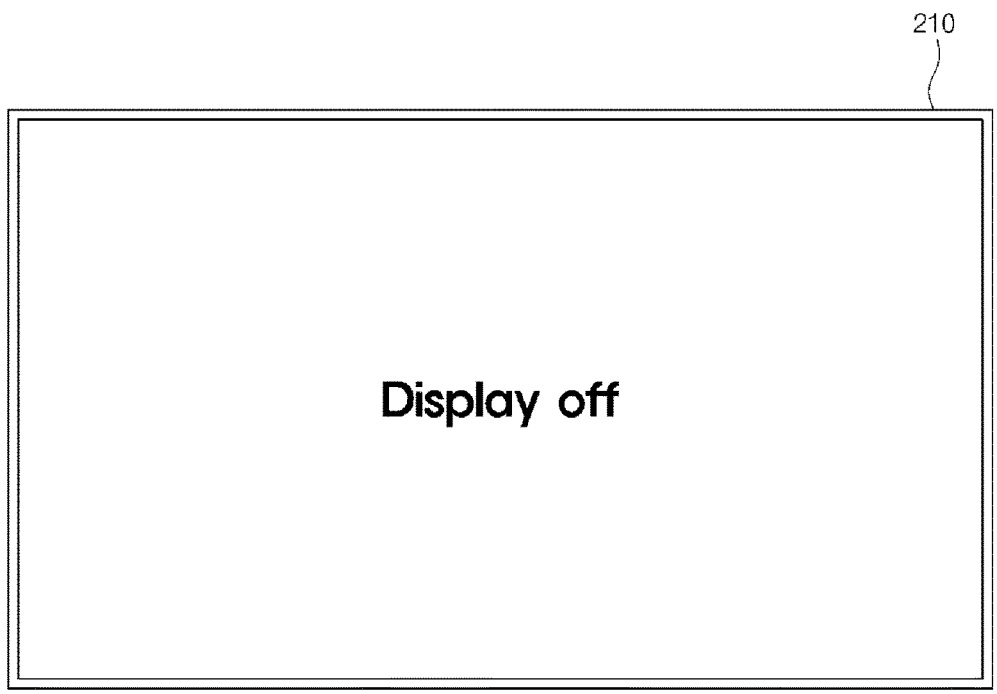
FIGS. 22 and 23 are exemplary diagrams illustrating a screen displayed on the display of the AVN device according to the user manipulation according to an exemplary embodiment of the present invention.
Figure 23:
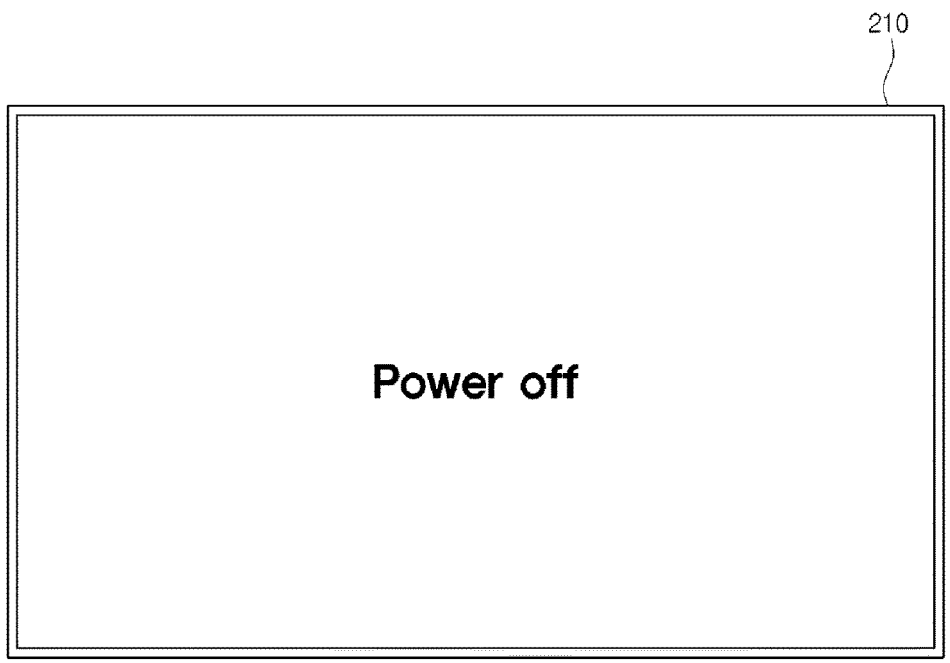

FIGS. 22 and 23 are exemplary diagrams illustrating a screen displayed on the display of the AVN device according to the user's manipulation; For example, the manipulating method described in FIG. 20 may be mapped with a hot key function for turning the display 210 off. In particular, when the user's hand shown in the user image (I) covers the center portion of the manipulating unit 110, the control signal generating unit 122 may be configured to generate a control signal for turning the display 210 off and transmit the signal to the AVN device 200.

Meanwhile, even when the display 210 is turned off, a running function may be continuously executed. For example, when the audio function is executed, music output through the speaker 220 may be continuously output even after the display 210 is turned off. When the navigation function is executed, a path guidance voice output through the speaker 220 may be continuously output even after the display 210 is turned off. Additionally, to distinguish the manipulation for the control command from manipulation for inputting other control commands or the user's operation independent from the control command, the control signal generating unit 122 may be configured to turn the display 210 off when the user's hand covers the substantially center portion of the manipulating unit 110 greater than a reference area, and furthermore, may be configured to turn the display 210 off when the user's hand covers the center portion of the manipulating unit 110 for a reference time or greater. In particular, the reference time may be set about the same as or set differently from the reference time applied to access the main menu or the reference time applied to access the context menu.

Alternatively, even when the reference time is not reached, when the pad 111 is directly pressed while the user's hand (H) covers the center portion of the manipulating unit 110, the display 210 may be turned off directly. In particular, the pressure detecting unit 113 may be configured to detect the pressure applied to the pad 111. When the output signal of the pressure detecting unit 113 indicates the pressure applied to the center portion of the manipulating unit 110, the control signal generating unit 122 may be configured to generate a control signal for turning the display 210 off directly without waiting for the reference time to be reached and transmit the signal to the AVN controller 230. In addition, when the manipulating unit 110 does not include a pressure detecting unit 113 as described above, it may be possible to determine whether the manipulating unit 110 is pressed using the output signal of the object detecting unit 112.

Alternatively, the manipulating method described in FIG. 20 may also be mapped with a hot key function for turning power of the AVN device 200 off. In particular, when the output signal of the object detecting unit 112, that is, the user's hand shown in the user image (I) covers the center portion of the manipulating unit 110, the control signal generating unit 122 may be configured to generate a control signal for turning the power of the AVN device 200 off and transmit the signal to the AVN device 200. When the power of the AVN device 200 is turned off, the functions being executed may be terminated. In addition, when the user's hand (H) covers the center portion of the manipulating unit 110, the display 210 may be turned off as illustrated in FIG. 22, and when the user's hand (H) presses the center portion of the manipulating unit 110, the power of the AVN device 200 may be turned off as illustrated in FIG. 23.

Moreover, exemplary embodiments of the vehicle control device 100 and the vehicle 10 may not be limited to the examples described with reference to FIGS. 11 to 23.

Specifically, when the user manipulates the manipulating unit 110 as exemplified in FIG. 11 and the user image (I) exemplified in FIG. 12 may be obtained, the main menu may not be accessed, but other hot key functions such as accessing the context menu, turning the display 210 off, and turning the power off may be executed. Similarly, when the manipulating unit 110 is manipulated as exemplified in FIG. 16 and the user image may be obtained as exemplified in FIG. 17, the context menu may not be accessed, but other hot key functions such as accessing the main menu, turning the display 210 off, and turning the power off may be executed. When the manipulating unit 110 is manipulated as exemplified in FIG. 20 and the user image (I) may be obtained as exemplified in FIG. 21, other hot key functions may be executed without turning the display 210 off or turning the power off.

Furthermore, a manipulating method for executing the hot key function is not limited to the method of covering the left and right end or the center portion of the manipulating unit 110 with the hand. Instead of the left end, the right end, or the center portion, a method of covering other areas of the manipulating unit 110 may be set as the manipulating method of executing the hot key function. For example, areas that correspond to four corners in which the left end and the right end of the manipulating unit 110 are separated into an upper area and a bottom area respectively, may be mapped with different hot key functions. When one of the four corners is covered by the user's hand, the mapped hot key function may be executed.

The operation of covering a predetermined area of the manipulating unit 110 with the hand as described above is a simplified operation that may be performed with reduced burdens while the vehicle is being driven. Therefore, when this operation is set as the manipulating method for executing the hot key function, the driver may input a desired control command while concentrating on driving and maintaining a posture. The control command that may be input by manipulating the manipulating unit 110 and may include a command for executing the hot key function and a command for selecting various menus displayed on the display 210. Hereinafter, details thereof will be described.

Figure 24:
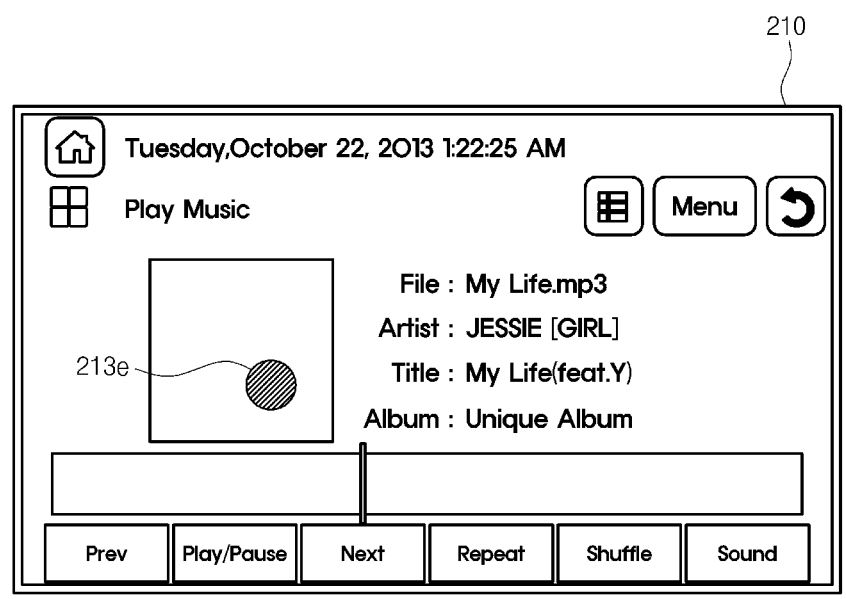
FIG. 24 is an exemplary diagram illustrating a display on which a pointing object corresponding to a finger position is displayed according to an exemplary embodiment of the present invention.
Figure 24:
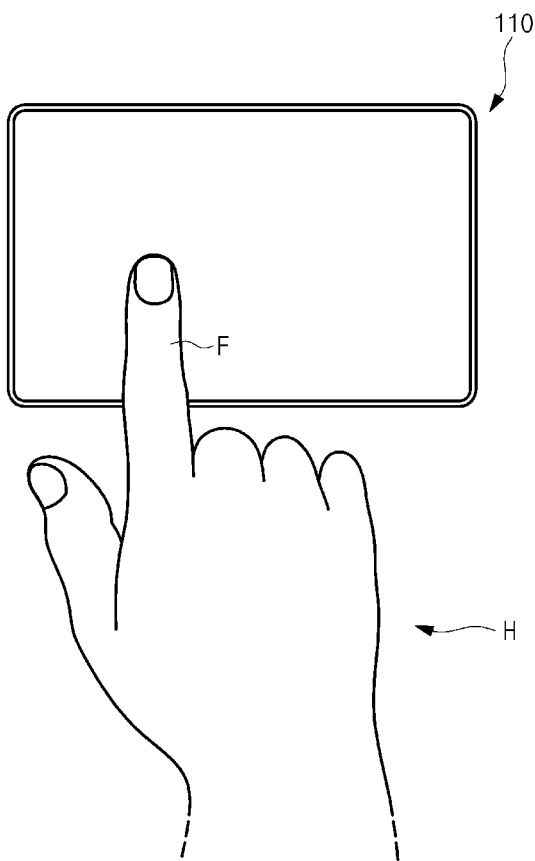

FIG. 24 is an exemplary diagram illustrating a display on which a pointing object that corresponds to a finger position is displayed. As illustrated in FIG. 24, the display 210 may be configured to display a pointing object 213e at a position that corresponds to a position of a finger (F) close to the manipulating unit 110. For this purpose, the control signal generating unit 122 may be configured to calculate a position of the finger (F) within a predetermined proximity to the manipulating unit 110. In particular, the position of the finger (F) may be a position on a two-dimensional (2D) plane of the manipulating unit 110 seen from a top view.

The control signal generating unit 122 may be configured to calculate the position of the finger (F) based on the output signal of the object detecting unit 112. It was previously mentioned that the user image (I) may be obtained by the output signal of the object detecting unit 112. For example, when the image is formed of an n×m pixel array, any pixel value $P(i, j)$ (i is an integer of $1 \leq i \leq n$ and j is an integer of $1 \leq j \leq m$) may have a value that corresponds to the output signal of the phototransistor array when an LED $(i, j)$ of the object detecting unit 112 is turned on. $P(i, j)$ may have a maximum value when there is no object that reflects light radiated from the LED $(i, j)$, and may have a minimum value when an object reflecting light is closest to the LED $(i, j)$. In particular, the object positioned on the manipulating unit 110 and reflecting light may be a finger of the user.

Due to a difference of individual elements of the LED and the phototransistor and a distribution difference of the LED and the phototransistor in the object detecting unit 112, P(i, j) may not have the same maximum value and minimum value for all (i, j). Therefore, a maximum value PM(i, j) and a minimum value Pm(i, j) of P(i, j) may be determined through experiments or statistics. Using these values, an image g(i, j) that is normalized according to the following Equation 1 may be obtained.

$$g(i, j) = \frac{P(i, j) - P_M(i, j)}{P_m(i, j) - P_M(i, j)} \quad \text{Equation 1}$$

Here, g(i, j) may have a value between about 0 and 1. Then, the control signal generating unit 122 may be configured to convert each pixel value of the normalized image into a level necessary for image processing and calculate a center of mass and ellipticity of the converted values. Coordinates of the image may be corrected (e.g., adjusted) using the calculated center of mass and ellipticity, the corrected coordinate value may be filtered through an adaptive low pass filter (LPF), and a position on the plane of the object may be calculated.

Specifically, a normalized image g(i, j) may be converted using a function h(g) on the unit interval. The function h(g) may have a form of h(g)=g^γ(γ>0) as in gamma correction used in image processing, but the function is not limited thereto and may have various other forms. Applying the function h(g) to the normalized image may be performed to emphasize a value that corresponds to a tip of the finger (F) in the user image (I) and allow the position of the finger (F) to be consequently obtained to be near the tip of the finger (F).

When an image that is converted from the normalized image g(i, j) by applying the function h(g) is set as h(i, j), a top left vertex of the manipulating unit 110 may be set as an origin point, a right direction may be set as an x axis, and a downward direction may be set as a y axis, coordinates of any point on the manipulating unit 110 may be represented as (x, y). In addition, coordinates of a center of mass (xc, yc) of h(i, j) may be obtained by the following Equation 2 and Equation 3.

$$x_c = \frac{\sum_{i=0}^{n}\sum_{j=0}^{m} ih(i, j)}{\sum_{i=0}^{n}\sum_{j=0}^{m} h(i, j)} \quad \text{Equation 2}$$

$$y_c = \frac{\sum_{i=0}^{n}\sum_{j=0}^{m} jh(i, j)}{\sum_{i=0}^{n}\sum_{j=0}^{m} h(i, j)} \quad \text{Equation 3}$$

When the finger (F) of the user manipulating the manipulating unit 110 is a thumb, the finger may appear to become longer in a diagonal direction in the user image (I) due to structural features of the finger. In particular, when coordinates of the finger (F) are determined using the center of mass as described above, consequently obtained coordinates may not correspond to a tip of the thumb but may have a value that corresponds to a position that is significantly shifted to a palm side. Therefore, it may be possible to correct an error caused by the structural features of the thumb.

First, e, which may be one of several possible values that are proportional to a length of the thumb, may be defined by the following Equation 4.

$$e = \sum_{i=0}^{n}\sum_{j=0}^{m} (i-x)(j-y)h(i, j) \quad \text{Equation 4}$$

A value of e calculated by the above Equation 4 may become 0 when the object shown in the image has a substantially circular shape, may become a positive number when the object shown in the image becomes longer in a descending diagonal direction, and may become a negative number when the object shown in the image becomes longer in an ascending diagonal direction. When the user is the driver and manipulates the manipulating unit 110 with a thumb of the right hand, the object shown in the image may appear to become longer in the descending diagonal direction, and e may have a positive value.

Furthermore, when the user is a passenger seated in the passenger seat 22 and manipulates the manipulating unit 110 with a thumb of the left hand, the object shown in the image may appear to become longer in the ascending diagonal direction, and e may have a negative value. By reflecting such a calculation result, coordinates of the center of mass may be corrected (e.g., adjusted) by the following Equation 5 and Equation 6.

$$x'_c = x_c - \beta\sqrt{|e|} \quad \text{Equation 5}$$

$$y'_c = y_c - \beta sgn(e)\sqrt{|e|} \quad \text{Equation 6}$$

Here, β is a positive real number indicating a degree of correction and may be determined by an experiment. However, when the finger (F) of the user manipulating the manipulating unit 110 is not the thumb, the coordinates of the center of mass ($x_c$, $y_c$) may not be corrected. In addition, the control signal generating unit 122 may be configured to estimate a height of the finger (F) from the pad 111 plane or the object detecting unit 112 or a distance (z) between the pad 111 plane or the object detecting unit 112 and the finger (F) using the image g(i, j) normalized by the above Equation 1. In this case, the following Equation 7 may be used.

$$z = 1 - \max_{(i, j)} g(i, j) \quad \text{Equation 7}$$

The previously defined g(i, j) may have a value between about 0 and 1, and may have a maximum value of about 1 when the finger (F) touches the pad 111 and maximum reflection occurs on the LED (i, j). Therefore, z may have a value between about 0 and 1. In other words, when the finger (F) touches the pad 111, z may have a value that is about 0 and when the finger (F) becomes sufficiently distant from the pad 111 (e.g., is beyond a predetermined distance), z may have a value of about 1. Therefore, a degree of nearness (e.g., a proximity degree) between the pad 111 and the finger (F) may be approximately represented. However, such a value may not indicate a value accurately proportional to a physical distance.

Further, parameters of the adaptive LPF may be determined by measuring a change rate of the height (z). In other words, the height (z) may be filtered using the LPF, the change rate may be measured by differentiating the filtered value, and the parameters of the adaptive LPF may be determined using the result. Applying the adaptive LPF may be performed to correspond to hand tremor and noise. When the low pass filtering is performed, the hand tremor may be alleviated but a time delay may occur simultaneously, which may cause substantially low reactivity. Accordingly, an intensity of the LPF may be adaptively changed based on a degree of movement of the finger (F). Specifically, when a change of $(x_c, y_c)$ or $(x'_c, y'_c)$ is substantially large (e.g., greater than a predetermined change), since maintaining of reactivity may become more significant than tremor alleviation, weak low pass filtering may be performed. When a change of $(x_c, y_c)$ or $(x'_c, y'_c)$ is substantially small (e.g., less than a predetermined change), since tremor alleviation may be more significant than reactivity, stronger low pass filtering may be performed.

Additionally, pointing may be stabilized to constantly maintain an estimate value (x, y) of a position of the finger (F) while touching the pad 111 by the finger (F). For this purpose, a change rate of z may be measured, and the change of (x, y) may be set to be smaller by increasing the intensity of the low pass filtering when z significantly decreases. In summary, variance of $(x_c, y_c)$ or $(x'_c, y'_c)$ may be measured and the change rate of z may be measured to determine the parameters of the LPF. First, z may be filtered using the LPF according to the following Equation 8.

$$\bar{z} = a_z \bar{z} + (1-a_z)z \qquad \text{Equation 8}$$

Here, $\bar{z}$ a value of z that is filtered by the LPF, and $a_z$ indicates a position of a pole of one-pole filter. A $V_z$ that is a change rate of z may be calculated using a difference between two successive $\bar{z}$ values. In addition, $\sigma_x$ that is a standard deviation of $x_c$ or $x'_c$ during recent w samples and $\sigma_y$ that is a standard deviation of $y_c$ or $y'_c$ during recent w samples may be calculated. Finally, $(x_c, y_c)$ or $(x'_c, y'_c)$ may be filtered to obtain $(\bar{x}, \bar{y})$ using the LPF according to the following Equation 9 and Equation 10.

$$\bar{x} = a_x \bar{x} + (1-a_x)x \qquad \text{Equation 9}$$

$$\bar{y} = a_y \bar{y} + (1-a_y)y \qquad \text{Equation 10}$$

Here, ax and ay may be determined by the following Equation 11 and Equation 12.

$$ax = \min(1, \max(0, a0 - \kappa \sigma x - \rho Vz)) \qquad \text{Equation 11}$$

$$ay = \min(1, \max(0, a0 - \kappa \sigma y - \rho Vz)) \qquad \text{Equation 12}$$

Here, a0 is a value between about 0 and 1 that determines an overall intensity of the LPF, κ is a positive parameter indicating a degree of reflection of the change rate of $(x_c, y_c)$ or $(x'_c, y'_c)$ and ρ is a positive parameter indicating a degree of reflection of the change rate of z.

When the control signal generating unit 122 calculates the position of the finger (F), $(x_c, y_c)$, $(x'_c, y'_c)$, or $(\bar{x}, \bar{y})$, and the height z or $\bar{z}$ indicating the degree of proximity between the finger (F) and the pad 111 as described above, the display 210 may be executed to display the pointing object 213e at a position that corresponds to the position of the finger (F) on the manipulating unit 110. However, the above method is merely an exemplary method of calculating the position or the height of the finger (F), and the exemplary embodiment of the present invention is not limited to the above example.

For this purpose, the control signal generating unit 122 or the AVN controller 230 may be configured to calculate a position on the display 210 that corresponds to the position of the finger (F) on the manipulating unit 110 according to the following Equation 13. According to a coordinate system in which a top left vertex of the display 210 is set as an origin point, a right direction may be set as an X axis, and a downward direction may be set as a Y axis, coordinates of any point on the display 210 may be called (X, Y).

$$\frac{X}{X_M} = \frac{x}{x_M}, \frac{Y}{Y_M} = \frac{y}{y_M} \qquad \text{Equation 13}$$

Here, $(x_M, y_M)$ denotes coordinates of a bottom right vertex of the manipulating unit 110 and $(X_M, Y_M)$ denotes coordinates of a bottom right vertex of the display 210. In other words, four vertexes of the rectangular manipulating unit 110 may correspond to four vertexes of the display 210, respectively, and internal points of the manipulating unit 110 linearly proportionally may correspond to internal points of the display 210, respectively. The manipulating unit 110 may have about the same aspect ratio as that of the display 210.

Referring again to FIG. 24, the pointing object 213e may be displayed at a position on the display 210 that corresponds to the position on the manipulating unit 110 in which the finger (F) is positioned. The user may view the pointing object 213e displayed on the display 210 and may determine to move the finger (F) to a certain position to perform a desired control. In other words, the user may receive feedback regarding the operation performed (e.g., the user manipulation). A shape of the pointing object 213e may be a circle as illustrated in FIG. 24, but the exemplary embodiments of the vehicle control device 100 and the vehicle 10 are not limited thereto. Instead of the circle, polygons such as a rectangle and a triangle or any shapes may be used, as long as the position of the finger (F) maybe displayed, distinguished from information displayed on the display 210.

Meanwhile, the pointing object 213e may be displayed on the display 210 when the finger (F) touches the pad 111, when the finger (F) does not touch but is within a predetermined proximity to the pad 111, and when the pad 111 is pressed. However, the pointing object 213e may be displayed differently for each state. For example, visual properties such as colors or shapes of the pointing object 213e may be displayed differently. For this purpose, these three states may be distinguished. The control signal generating unit 122 may be configured to distinguish the three states using the output signal of the object detecting unit 112 and distinguish the three states using the output signals of the object detecting unit 112 and the pressure detecting unit 113.

It was previously mentioned that the degree of proximity between the manipulating unit 110 and the finger (F) may be represented as the height z. When a thickness of the pad 111 is considered in addition to the height z, it may be possible to determine whether the finger (F) currently touches the pad 111 or does not touch but is within the predetermined proximity to the pad 111. Based on a determination result, when the state in which the finger (F) is within the predetermined proximity to the pad 111 is transited to the touching state, it may be possible to change visual properties of the pointing object 213e. As an example of changing color properties, when the finger (F) touches the pad 111, the color may become darker than before touching. In other words, transparency may be decreased.

The state in which the finger (F) presses the pad 111 may be determined using the output signal of the pressure detecting unit 113, but may also be determined using the output signal of the object detecting unit 112. Since the pad 111 may be made of a gel-like material having elasticity, when the finger (F) presses the pad 111 (e.g., when pressure is applied to the pad 111), a pressed part of the pad 111 may be depressed and a distance between the finger (F) and the object detecting unit 112 may decrease. Therefore, the control signal generating unit 122 may be configured to determine whether the finger (F) presses the pad 111 using the z value that indicates the distance between the finger (F) and the object detecting unit 112.

Alternatively, it may be possible to determine whether the finger (F) presses the pad 111 using a pattern of the z value. When the finger (F) presses the pad 111 rather than contacting or touching the pad 111, a significant change of z may be expected. Therefore, when the z value is significantly changed, it may be determined that the finger (F) presses the pad 111. Based on a determination result, when the state of the finger (F) is transited from the touching state to the pressing state, it may be possible to change visual properties of the pointing object 213e. As an example of changing color properties, the color of the pointing object 213e may become darker when the finger (F) presses the pad 111 than when the finger (F) touches the pad 111.

Additionally, as an example of changing shape properties, a size of the pointing object 213e may increase or decrease when the finger (F) touches the pad 111 or presses the pad 111. When the finger (F) does not touch the manipulating unit 110, visual properties of the pointing object 213e may be displayed differently according to the degree of proximity between the finger (F) and the manipulating unit 110. For example, as the finger (F) becomes closer (e.g., approaches) to the manipulating unit 110, the color of the pointing object 213e may become darker. In other words, as the distance between the finger (F) and the manipulating unit 110 increases, transparency of the pointing object 213e may increase and the pointing object 213e may not be displayed at a predetermined limit or greater.

Furthermore, while a semi-transparent shadow of the pointing object 213e may be displayed below the pointing object 213e, a distance between the pointing object 213e and the shadow may be displayed in proportion to the distance between the finger (F) and the manipulating unit 110. The user may move the finger (F) on the manipulating unit 110 until the pointing object 213e is positioned on a menu button to be selected by the user. When the pointing object 213e is positioned on the menu button to be selected by the user, it may be possible to press the pad 111. When the pad 111 is pressed, the menu button displayed at the position of the pointing object 213e on the display 210 may be selected. Before the user presses the pad 111, no menu button may be selected. Therefore, even when the user does not perform control through the manipulating unit 110, the user may merely rest the hand on the pad 111 and continue to drive in a stable posture.

Figure 25:
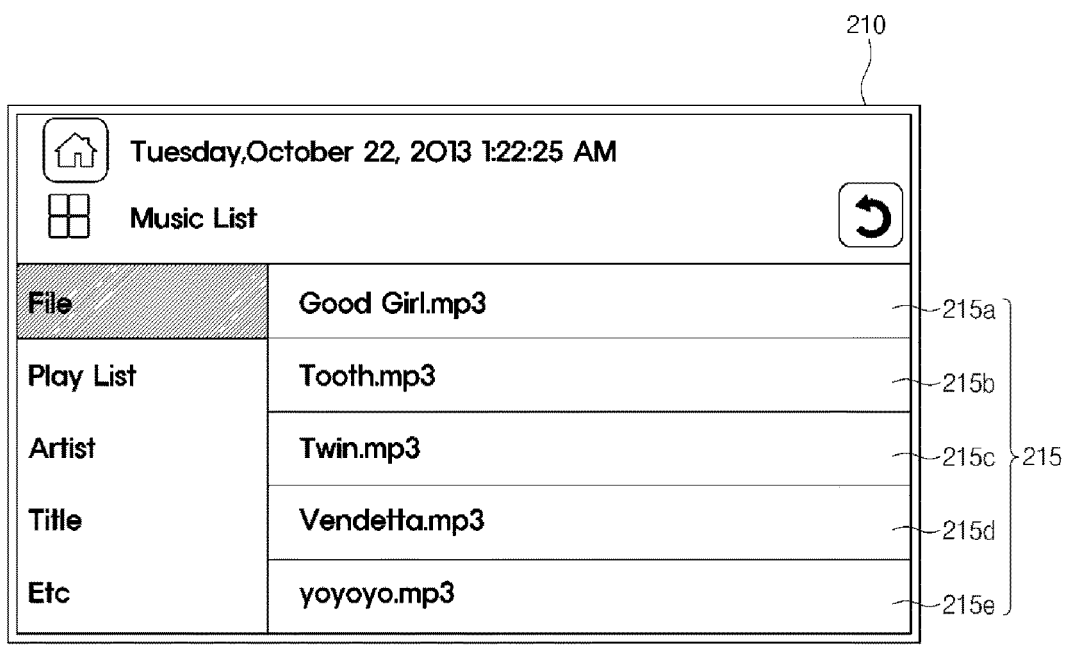
FIG. 25 is an exemplary diagram illustrating a display on which a menu list successively listing a plurality of menu buttons is displayed according to an exemplary embodiment of the present invention.
Figure 26:
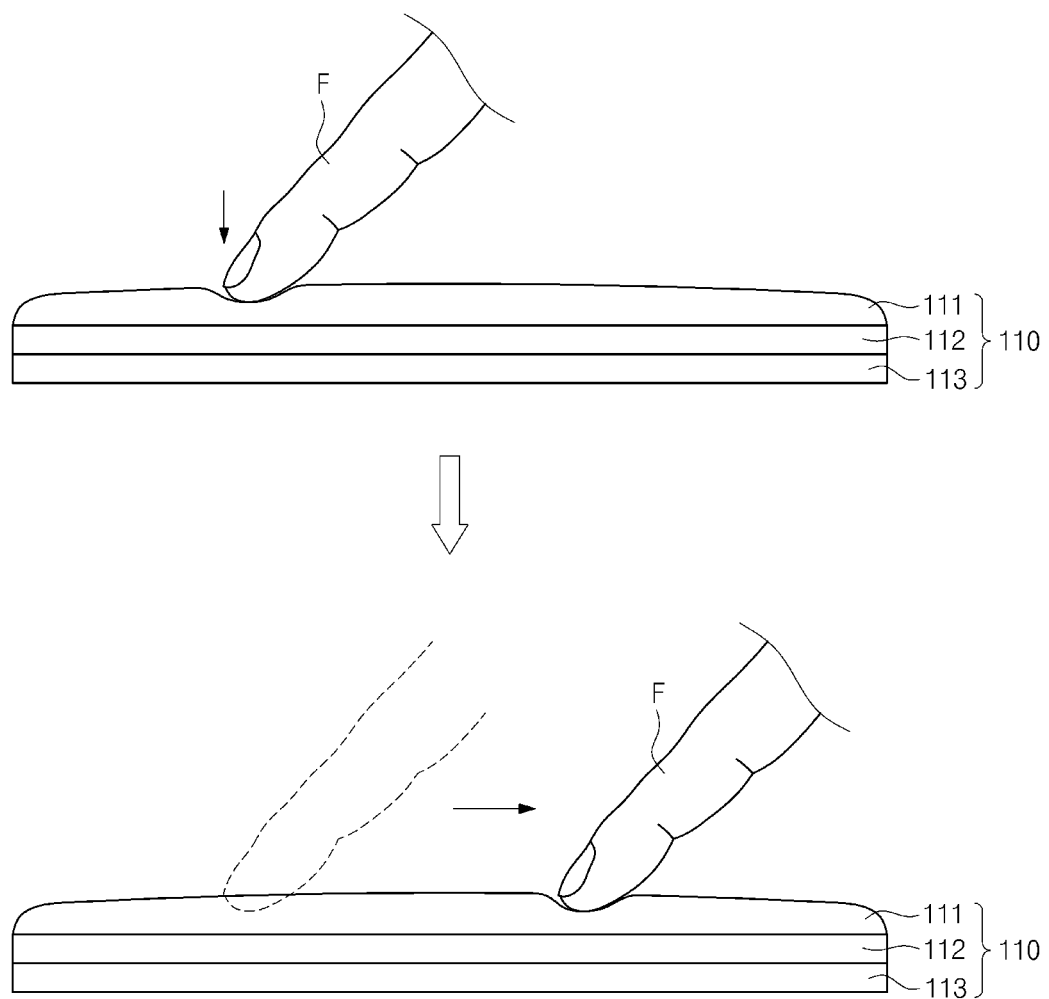
FIG. 26 is an exemplary diagram illustrating a drag operation for moving a menu list according to an exemplary embodiment of the present invention.

FIG. 25 is an exemplary diagram illustrating a display on which a menu list successively listing a plurality of menu buttons is displayed. FIG. 26 is an exemplary diagram illustrating a drag operation for moving a menu list. As illustrated in FIG. 25, the display 210 may be configured to display a menu list 215 in which selectable menu buttons are successively listed. In the example of FIG. 25, a plurality of menu buttons (215a to 215e) for selecting music may be listed. The user may move the finger (F) on the manipulating unit 110 such that the pointing object 213e is positioned on a desired menu button, and apply pressure to the pad 111 with the finger (F). Therefore, the desired menu button may be selected. However, the menu buttons included in the menu list 215 may not be displayed in a single screen. In particular, the user may move the menu list 215 by a method in which the finger (F) drags the pad 111 as illustrated in FIG. 26.

In order to perform a drag movement, the finger (F) may first press the pad 111 of a position that corresponds to a drag start point. While the pad 111 is being pressed or the finger (F) touches the pad 111, the finger (F) may move in a desired direction. As illustrated in FIG. 25, when menu buttons 215a to 215e are vertically listed, the finger (F) may move up or down such that menu buttons that were not shown in the screen appear. As illustrated in FIG. 26, when the finger (F) moves in a downward direction, menu buttons that were not shown in an upper part appear. Additionally, when the finger (F) moves in an upward direction, menu buttons that were not shown in a bottom part appear. A degree of moving the menu list may be proportional to a moving degree of the finger (F) or may also be proportional to a moving speed of the finger (F). When the desired menu button is displayed on the display 210, the user may position the pointing object 213e on the desired menu button and presses the pad 111 to select the menu button.

Figure 27:
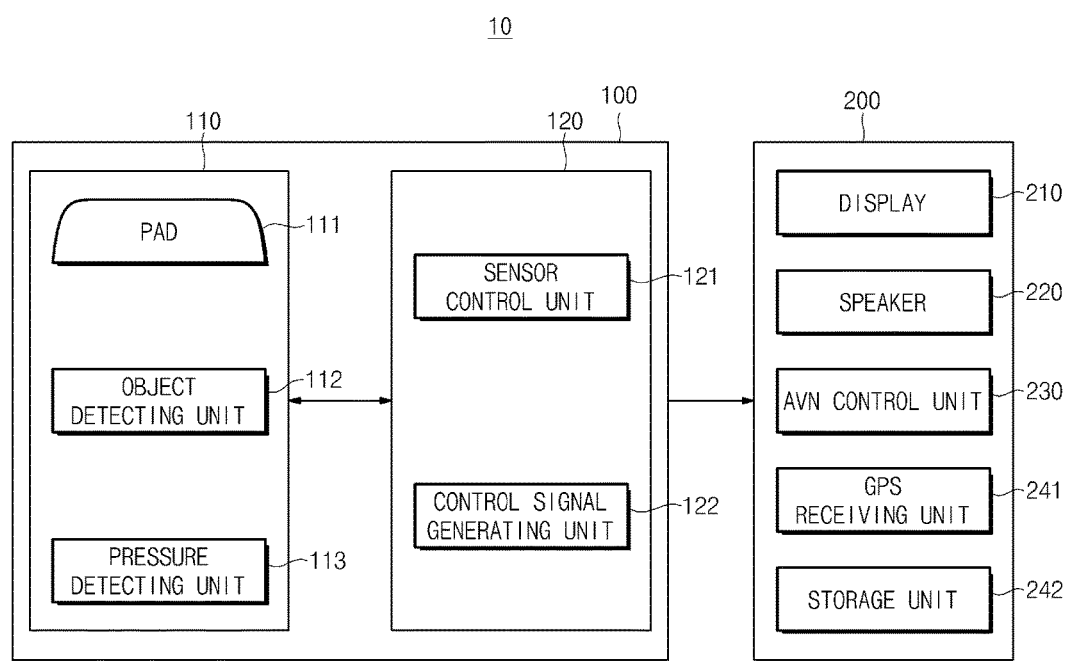
FIG. 27 is an exemplary block diagram illustrating a configuration of the AVN device that performs a navigation function according to an exemplary embodiment of the present invention.
Figure 28:
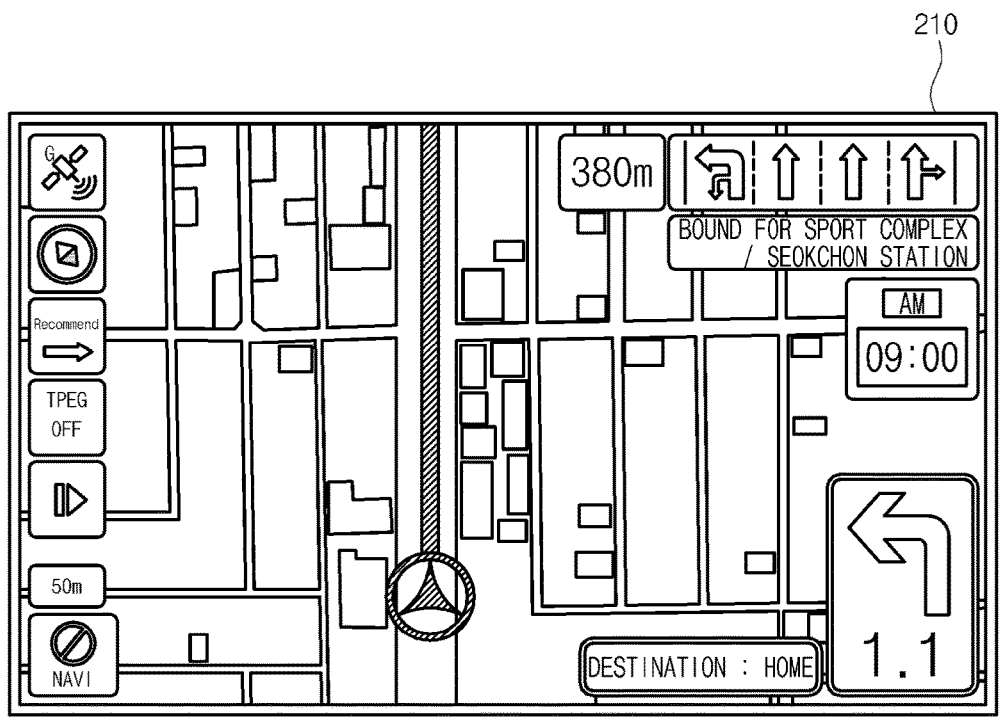
FIGS. 28 and 29 are exemplary diagrams illustrating a map screen that is displayed on the display when the navigation function is performed according to an exemplary embodiment of the present invention.
Figure 29:
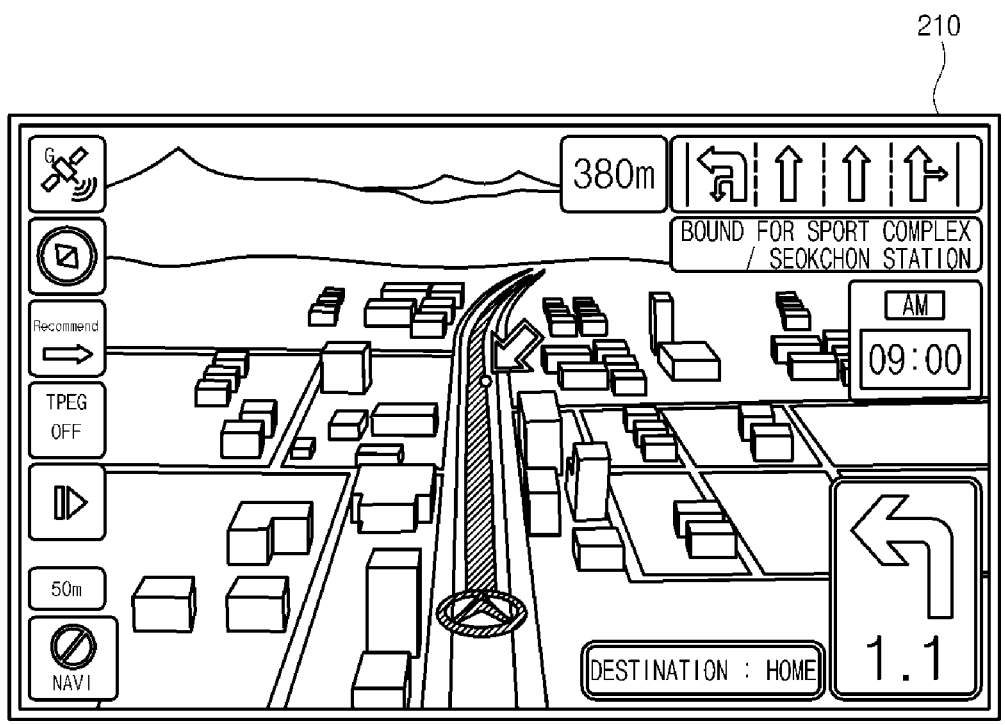

The navigation function may be one of functions that may be performed by the AVN device 200. Hereinafter, an exemplary embodiment in which the user controls the navigation function by manipulating the manipulating unit 110 will be described in detail. FIG. 27 an exemplary diagram illustrating a configuration of the AVN device that performs a navigation function. FIGS. 28 and 29 are exemplary diagrams illustrating an exemplary map screen displayed on the display when the navigation function is performed. As illustrated in FIG. 27, the AVN device 200 performing the navigation function may include a global positioning system (GPS) receiving unit 241 configured to receive position information of the vehicle 10 from global positioning system (GPS) satellites and a storage unit 242 configured to store map data.

The AVN controller 230 may be configured to generate a driving path from a departure position to a destination using the map data stored in the storage unit 242 and store the generated driving path in the storage unit 242. The departure position may be a current position of the vehicle 10 received from the GPS receiving unit 241 or a position separately set by the user. Then, when the vehicle is driven, the display 210 may be configured to display a driving path that corresponds to the current position of the vehicle 10 and may also be configured to display the current position of the vehicle 10 on the displayed driving path.

Meanwhile, the map data stored in the storage unit 242 may be map data that includes three-dimensional (3D) information. The AVN controller 230 may be configured to operate the display 210 to display the map data according to various view angles. The display 210 may be configured to display the map data according to a vertical view seen vertically from the sky as illustrated in FIG. 28, or display the map data according to a bird's-eye view seen from a view of a constant angle as illustrated in FIG. 29, other than the vertical view. When the map data is displayed according to the vertical view, 2D information on the driving path may be substantially provided. When the map data is displayed according to the bird's-eye view, 3D information on the driving path may be provided.

Depending on circumstances, information provided in the vertical view may be useful or information provided in the bird's-eye view may be useful. In the related art, the user is required to perform operations such as entering a setting menu of a navigation and adjusting a view angle. However, in the exemplary embodiments of the vehicle control device 100 and the vehicle 10, the user may manipulate the manipulating unit 110 to adjust the view angle while the display 210 is displaying the driving path.

Figure 30:
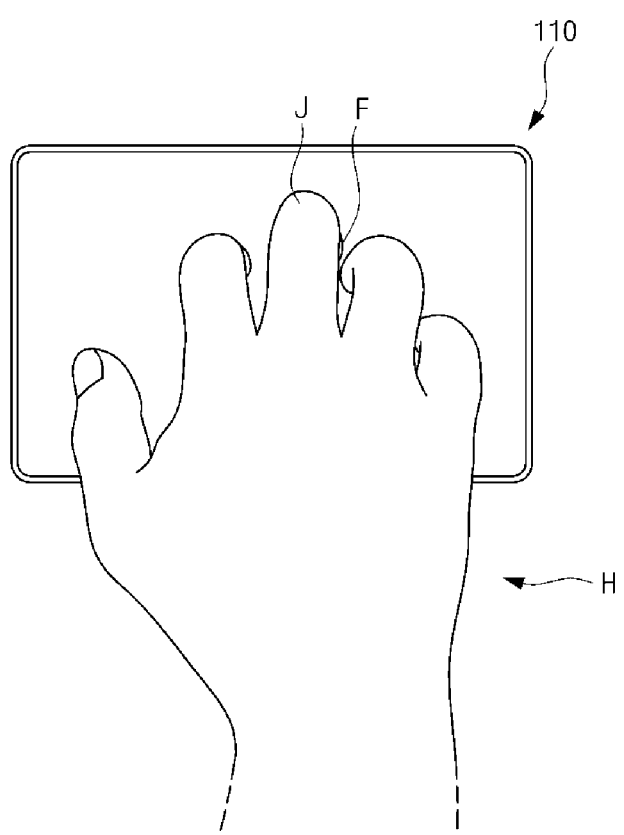
FIGS. 30 and 31 are exemplary diagrams illustrating exemplary manipulation for displaying a vertical view according to an exemplary embodiment of the present invention.
Figure 31:
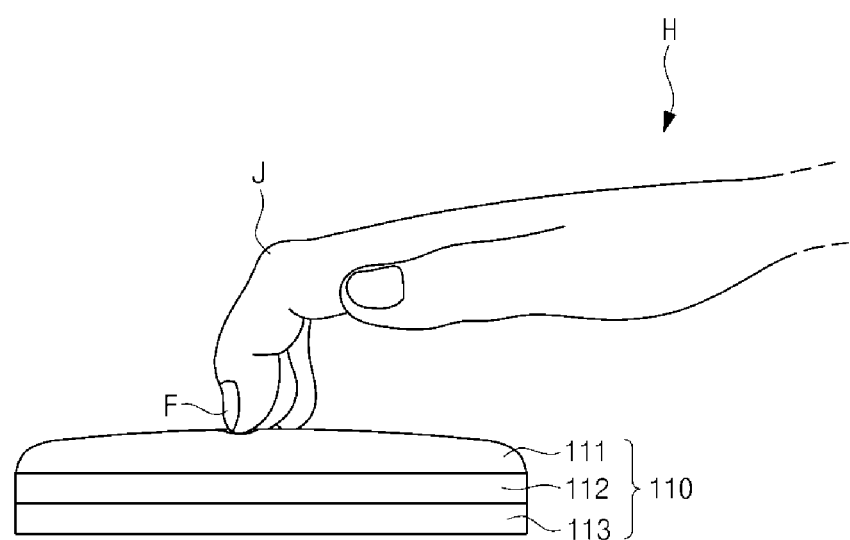
Figure 32:
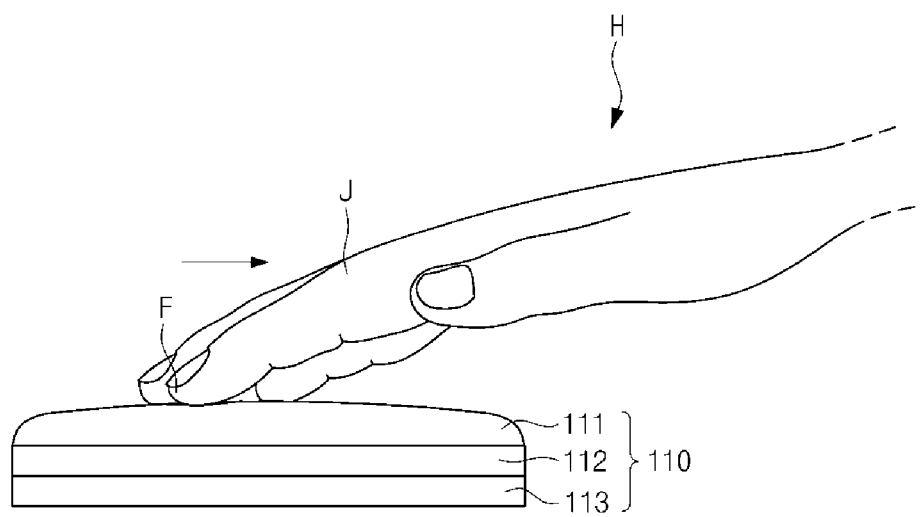
FIG. 32 is an exemplary diagram illustrating exemplary manipulation for displaying a top view according to an exemplary embodiment of the present invention.

FIGS. 30 and 31 are exemplary diagrams illustrating exemplary manipulation for displaying a vertical view. FIG. 32 is an exemplary diagram illustrating exemplary manipulation for displaying a bird's-eye view. FIG. 30 is an exemplary diagram in which the hand (H) manipulating the manipulating unit 110 is seen from the top. FIG. 31 is exemplary diagram in which the hand (H) manipulating the manipulating unit 110 is seen from a side. As illustrated in FIGS. 30 and 31, while two or more fingers (F) touch or press the manipulating unit 110, when the finger (F) is bent at about 90 degrees, the map data may be displayed based on the vertical view as illustrated in FIG. 28. In particular, bending the finger (F) at about 90 degrees refers to erecting a part from a tip of the finger (F) to a first or second joint (J) at about 90 degrees with respect to a surface of the pad 111.

When the map data is displayed according to the vertical view, the user may more accurately recognize points of left turn, right turn, or U-turn, and may check an intersection or a distance more accurately. Meanwhile, when the driver desires to check conditions of the following driving path and which roads or buildings are located ahead, displaying the map data according to the bird's-eye view may be more effective. In particular, the user may flatten or unfold the finger (F) on the pad 111 in an angle less than about 90 degrees as illustrated in FIG. 32, and the display 210 may be configured to display the map data according to the bird's-eye view that corresponds to the angle of the finger (F) as illustrated in FIG. 29.

In summary, when the display 210 displays the map data according to the vertical view as illustrated in FIG. 28, when the user lays down the finger (F), that is, straightens the finger, on the pad 111 in an angle less than about 90 degrees as illustrated in FIG. 32, the view angle may be changed to an angle that corresponds to the angle of the finger (F) and the map data may be displayed according to the bird's-eye view. In addition, when the display 210 displays the map data according to the bird's-eye view as illustrated in FIG. 29, when the user bends the finger (F) on the pad 111 at about 90 degrees as illustrated in FIGS. 30 and 31, the map data may be displayed according to the vertical view.

However, even when the user desires to see the map data according to the vertical view, it may be difficult to accurately bend the finger (F) at about 90 degrees. Therefore, a reference angle that corresponds to the vertical view may be set in advance. When the finger (F) of the user is bent in the reference angle or greater, the map data may be displayed according to the vertical view. For example, when the reference angle is set to about 70 degrees, when the angle of the finger (F) of the user is greater than about 70 degrees, the map data may be displayed according to the vertical view, and when the angle of the finger (F) of the user is about 70 degrees or less, the map data may be displayed according to the bird's-eye view that corresponds to the angle.

As described above, when the view angle of the map data displayed on the display 210 is to be changed according to the angle of the finger (F) on the manipulating unit 110, a process of calculating the angle of the finger (F) is necessary. Hereinafter, details thereof will be described with reference to FIGS. 33 and 34.

Figure 33:
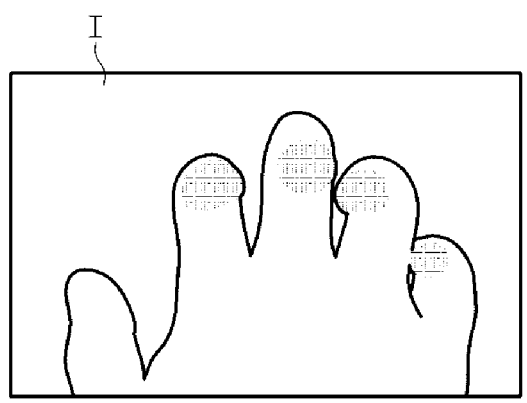
FIG. 33 is an exemplary diagram illustrating a user image obtained when manipulation for displaying the vertical view is performed according to an exemplary embodiment of the present invention.
Figure 34:
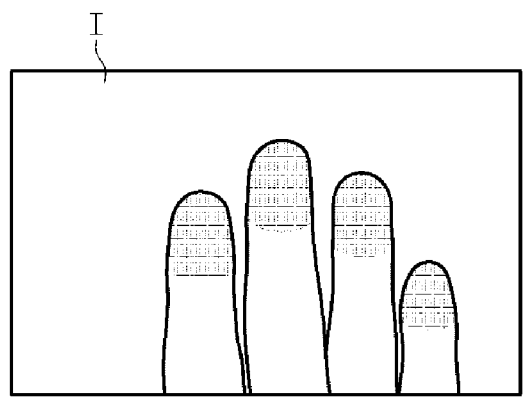
FIG. 34 is an exemplary diagram illustrating a user image obtained when manipulation for displaying the top view is performed according to an exemplary embodiment of the present invention.

FIG. 33 is an exemplary diagram illustrating an exemplary user image obtained when manipulation for displaying the vertical view is performed. FIG. 34 is an exemplary diagram illustrating an exemplary user image obtained when manipulation for displaying the bird's-eye view is performed.

It was previously mentioned that the user image (I) may be obtained from the output signal of the object detecting unit 112. When the user performs the manipulation as in FIGS. 30 and 31 to display the vertical view, the user image (I) exemplified in FIG. 33 may be obtained. When the user performs the manipulation as in FIG. 32 to display the bird's-eye view, the user image (I) exemplified in FIG. 34 may be obtained. The control signal generating unit 122 may be configured to calculate a distance between a finger joint (J) and a tip of the finger (F) touching the pad 111 from the user image (I). The distance between the tip of the finger (F) and the finger joint (J) shown in the user image (I) may differ according to a degree of bending the finger (F). As the degree of bending the finger increases, the distance thereof may decrease.

In addition, the control signal generating unit 122 may be configured to calculate a distance between the finger joint (J) and the manipulating unit 110 from the user image (I). Brightness of the user image (I) may also differ according to the distance between the manipulating unit 110 and the object. The examples in FIGS. 33 and 34 illustrate a case in which the user image (I) becomes darker as the distance between the manipulating unit 110 and the object decreases. Therefore, when the user vertically bends the finger (F) as illustrated in FIGS. 30 and 31, the tip of the finger (F) touching the pad 111 appears dark (e.g., with a brightness of a predetermined level) and brightness of the finger (F) may increase in a palm direction as exemplified in FIG. 33.

Further, when the user unfolds the finger (F) as illustrated in FIG. 32, brightness from the tip of the finger (F) touching the pad 111 to a palm may become substantially uniform or slightly brighter (e.g., increase by a predetermined brightness level) as exemplified in FIG. 34. Therefore, the control signal generating unit 122 may be configured to calculate the distance between the finger (F) and the manipulating unit 110 from a brightness pattern of the finger (F) shown in the user image (I). Based on the distance between the tip of the finger (F) and the finger joint (J) and the distance between the finger joint (J) and the manipulating unit 110, the angle of the finger (F) may be calculated.

Although the user manipulates the manipulating unit 110 with four fingers (F) in the examples of FIGS. 30 to 32, there is no need to positively use the four fingers (F). When two or more fingers (F) are used, it may be possible to input the control command related to the view angle through the manipulating unit 110. To prevent the manipulation for adjusting the view angle from being confused with other operations such as a zoom operation, two or more fingers (F) may press first the pad 111. However, when the pad 111 is not pressed but is only touched, when an operation of bending the finger (F) is subsequently performed after the touch, it may be determined as manipulation for adjusting the view angle.

When the angle of the finger (F) is calculated, the control signal generating unit 122 may be configured to generate a control signal for adjusting the view angle according to the calculated angle of the finger (F) and may be configured to transmit the signal to the AVN device 200. The AVN controller 230 may be configured to operate the display 210 according to the transmitted control signal. The vehicle control device 100 may be configured to operate various devices for convenience disposed within the vehicle 10 in addition to the AVN device 200. As another example, the vehicle control device 100 may be configured to operate an air conditioning device 300. Hereinafter, details thereof will be described.

Figure 35:
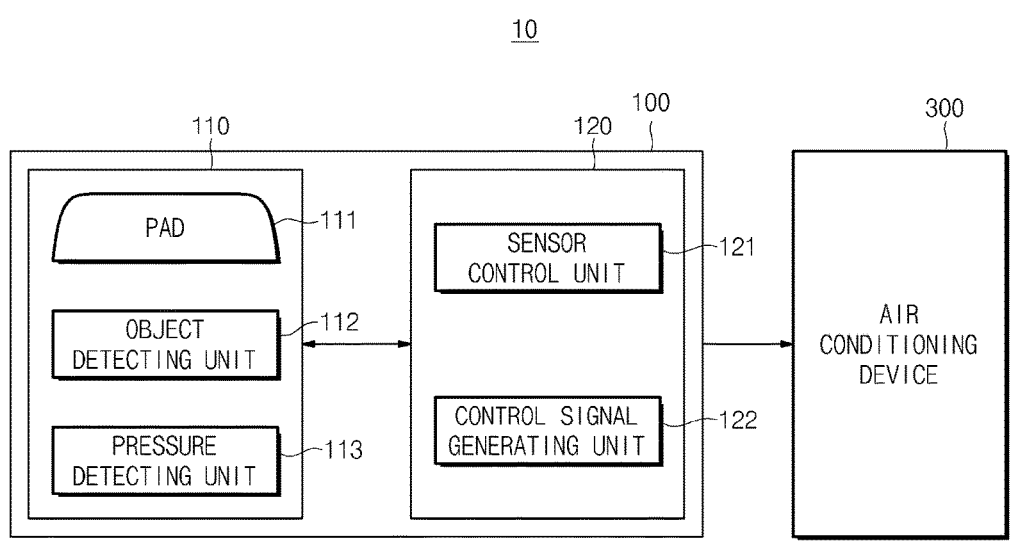
FIG. 35 is an exemplary diagram of a vehicle that includes a vehicle control device for operating an air conditioning device according to an exemplary embodiment of the present invention.

FIG. 35 is an exemplary diagram of a vehicle that includes a vehicle control device for controlling an air conditioning device. As illustrated in FIG. 35, the vehicle 10 may include the vehicle control device 100 and the air conditioning device 300. The vehicle control device 100 may be configured to operate the air conditioning device 300. The air conditioning device 300 may be configured heat or cool an inside of the vehicle 10 (e.g., increase or decrease an interior temperature of the vehicle). Specifically, the air conditioning device 300 may include a condenser configured to condense and liquefy a cooling medium, an evaporator configured to vaporize the liquefied cooling medium, a compressor configured to compress the cooling medium, an indoor and outdoor air door configured to selectively discharge or introduce indoor air or outdoor air of the vehicle 10, a ventilator configured to transmit the air introduced through the indoor and outdoor air door to the evaporator, a heater core configured to regulate a temperature of the air introduced into the vehicle 10, a cooling water line configured to cool the heater core, a temperature regulating door disposed between the evaporator and the heater core and configured to adjust a flow of the air passing the evaporator to the heater core, a ventilation opening configured to introduce the air passing the evaporator or the heater core into the vehicle 10, and the like.

Since the air conditioning device disposed within the vehicle 10 is well known technology, detailed description thereof will be omitted. In general, the hard key disposed on the center fascia 33 of the dashboard 32 may be manipulated to input a control command for the air conditioning device 300. However, the vehicle 10 according to the exemplary embodiment may receive the control command for the air conditioning device 300 using the vehicle control device 100. For example, a menu screen related to operation of the air conditioning device 300 may be displayed on the display 210. As described above, the user may manipulate the manipulating unit 110 with the finger (F) to input the control command.

However, even when the menu screen related to operation of the air conditioning device 300 is not displayed on the display 210, the user may manipulate the manipulating unit 110 to input the control command. Specifically, when a part of the manipulating unit 110 is mapped with the operation of the air conditioning device 300 and the hand covers the mapped part, the vehicle control device 100 may be in a state in which the control command for the air conditioning device 300 may be received. When the vehicle control device 100 is in the state in which the control command for the air conditioning device 300 may be received, the user may manipulate the manipulating unit 110 to operate the air conditioning device 300. For example, as illustrated in FIG. 26, when the finger (F) presses a part of the pad 111, the finger (F) may move up to increase a temperature or move down to decrease a temperature while the press continues or the pad 111 is touched.

Additionally, the vehicle control device 100 installed within the vehicle 10 may be used to adjust positions or angles of seats. Furthermore, the various devices for convenience disposed within the vehicle 10 may be operated by the vehicle control device 100. When the vehicle is operated using the vehicle control device described above, the user's manipulation feeling and convenience may increase. By providing visual and tactile feedbacks to the user, it may be possible to improve accuracy of manipulation.

Further, by performing the hot key function using a simplified manipulating method, a plurality of hard keys may be omitted. Therefore, an effect of saving a space may be obtained, and the control command may be more stably input while driving. In the vehicle control device and the vehicle having the same according to the exemplary embodiments of the present invention, the user may manipulate the manipulating unit more easily while driving such that the control command of various devices for convenience disposed within the vehicle may be input.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A vehicle control device, comprising: a manipulator that includes an object detector configured to detect an object in a noncontact manner and a pad having elasticity configured to contact the object and disposed above the object detector; and a controller configured to generate a control signal to operate the vehicle based on an output signal from the object detector, wherein the manipulator is disposed in a center console between a driver seat and a passenger seat or connected to an arm rest between the driver seat and the passenger seat, wherein the controller is configured to determine whether the pad is pressed by the object based on a height of the object on the pad, as wherein a display is configured to display a view angle of map data differently according to a calculated angle of a finger, and wherein the display is configured to display the map data according to a vertical view when the calculated angle of the finger is between a reference angle and ninety degrees.

2. The device according to claim 1, wherein the pad is made of a gel-like elastic body.

3. The device according to claim 1, wherein the object detector includes at least one selected from a group consisting of: a capacitive proximity sensor, an ultrasonic proximity sensor, and an optical proximity sensor.

4. The device according to claim 1, wherein the object detector includes a plurality of two-dimensionally arranged sensors.

5. The device according to claim 1, wherein the controller is configured to calculate a position or a height of the object on the pad based on an output signal of the object detector.

6. The device according to claim 1, wherein the pad further includes a pressure detector disposed below the object detector and configured to detect a pressure.

7. A vehicle, comprising: a manipulator that includes an object detector configured to detect an object in a noncontact manner and a pad having elasticity configured to contact the object and disposed above the object detector; an audio video navigation (AVN) device including a display; and a controller configured to generate a control signal for operating the AVN device based on an output signal from the object detector, wherein the manipulator is disposed in a center console between a driver seat and a passenger seat or connected to an arm rest between the driver seat and the passenger seat, wherein the controller is configured to calculate a position or a height of the object on the manipulator based on an output signal of the object detector, wherein the controller is configured to determine whether the manipulator is pressed by the object based on the height of the object on the manipulating unit, ad wherein the display is configured to display a view angle of map data differently according to a calculated angle of a finger, and wherein the display is configured to display the map data according to a vertical view when the calculated angle of the finger is between a reference angle and ninety degrees.

8. The vehicle according to claim 7, wherein the pad is made of a gel-like elastic body.

9. The vehicle according to claim 7, wherein the object detector includes at least one selected from a group consisting of: a capacitive proximity sensor, an ultrasonic proximity sensor, and an optical proximity sensor.

10. The vehicle according to claim 7, wherein the object detector includes a plurality of two-dimensionally arranged sensors.

11. The vehicle according to claim 7, wherein the manipulator further includes a pressure detector disposed below the object detector and configured to detect a pressure.

12. The vehicle according to claim 7, wherein the display is configured to display a pointing object at a position that corresponds to the position of the object on the manipulator.

13. The vehicle according to claim 12, wherein the display is configured to display visual properties of the pointing object differently according to the height of the object on the manipulator.

14. The vehicle according to claim 12, wherein the display is configured to display at least one menu button, and the controller is configured to generate a control signal for selecting a menu button in which the pointing object is positioned among the plurality of menu buttons when the manipulator is pressed.

15. The vehicle according to claim 7, wherein the controller is configured to obtain a user image from an output signal of the object detector.

16. The vehicle according to claim 15, wherein the controller is configured to determine whether a predetermined area of the manipulator is covered based on the user image.

17. The vehicle according to claim 16, wherein the display is configured to display a menu list mapped with the predetermined area when the predetermined area of the manipulator is covered.

18. The vehicle according to claim 16, wherein the display is configured to display a menu list mapped with the predetermined area when the predetermined area of the manipulator is covered for a reference time or greater.

19. The vehicle according to claim 18, wherein the display is configured to display a reference bar indicating a ratio of a time for which the predetermined area of the manipulator is covered relative to the reference time.

20. The vehicle according to claim 16, wherein the display is configured to display a menu list mapped with the predetermined area when the predetermined area of the manipulator is pressed.

21. The vehicle according to claim 16, wherein the display is turned off by the controller when the predetermined area of the manipulator is covered.

22. The vehicle according to claim 16, wherein the display is turned off by the controller when the predetermined area of the manipulator is pressed.

23. The vehicle according to claim 16, wherein the AVN device is turned off by the controller when the predetermined area of the manipulator is pressed.

24. The vehicle according to claim 15, wherein the display is configured to display the map data for performing a navigation function.

25. The vehicle according to claim 24, wherein the controller is configured to calculate the angle of the finger touching the pad based on the user image.

26. The vehicle according to claim 7, wherein the display is configured to display the map data according to a bird's-eye view that corresponds to the calculated angle of the finger when the calculated angle of the finger is a reference angle or less.

* * * * *